United States Patent [19]
Ikeda

[11] Patent Number: 5,835,015
[45] Date of Patent: Nov. 10, 1998

[54] SECURITY SYSTEM FOR AUDIO EQUIPMENT

[75] Inventor: Yuji Ikeda, Kobe, Japan

[73] Assignee: Fujitsu Ten Limited, Hyogo, Japan

[21] Appl. No.: 804,145

[22] Filed: Feb. 20, 1997

Related U.S. Application Data

[62] Division of Ser. No. 505,336, Oct. 20, 1995, Pat. No. 5,732,237.

[30] Foreign Application Priority Data

Dec. 24, 1993 [JP] Japan ................................. 5-327672
May 26, 1994 [JP] Japan ................................. 6-112966

[51] Int. Cl.$^6$ ................................................. G08B 13/14
[52] U.S. Cl. ........................................... 340/568; 395/491
[58] Field of Search ................................. 340/568, 687, 340/426; 395/429, 439, 491

[56] References Cited

U.S. PATENT DOCUMENTS

| | | | |
|---|---|---|---|
| 4,679,026 | 7/1987 | Knakowski et al. | 340/568 |
| 4,720,700 | 1/1988 | Seibold et al. | 340/568 |
| 4,866,416 | 9/1989 | Holzhauer et al. | 340/568 |
| 5,263,147 | 11/1993 | Francisco et al. | 395/491 |
| 5,297,268 | 3/1994 | Lee et al. | 395/491 |

FOREIGN PATENT DOCUMENTS

| | | |
|---|---|---|
| 2-42825 | 2/1990 | Japan . |
| 3-94660 | 9/1991 | Japan . |
| 4-205965 | 7/1992 | Japan . |

Primary Examiner—Thomas J. Mullen, Jr.
Assistant Examiner—John Tweel, Jr.
Attorney, Agent, or Firm—Wenderoth, Lind & Ponack, L.L.P.

[57] ABSTRACT

The present invention provides a security system for audio equipment which allows users to easily release a security operation without having to remember any identification numbers or codes. The present invention provides a security system for audio equipment in which audio equipment in an inoperable condition is changed into an operable condition when data recorded on a recording medium during a playback condition matches identification data stored in a memory. Thus, the present invention allows users to easily release the security operation without compromising the level of security. Furthermore, the present invention prevents the audio equipment from being placed in an unlockable condition due to careless operation of users.

5 Claims, 16 Drawing Sheets

PREMASTERED DISC

RECORDABLE DISC

HYBRID DISC

SECURITY SYSTEM FOR AUDIO EQUIPMENT

This is a division application of Ser. No. 08/505,336, filed Oct. 20, 1995 now U.S. Pat. No. 5,732,237.

TECHNICAL FIELD OF THE INVENTION

The present invention relates to a security system for preventing audio equipment, automotive audio equipment in particular, from being stolen.

BACKGROUND ART

Audio equipment which is prone to theft, incorporates an anti-theft system which uses a secret identification code for prevention of theft. Such an anti-theft system requires the purchaser of the audio equipment to manually enter a specific identification code, which the purchaser will remember, by using, for example, numeric keys which are on the equipment. The entered identification code is compared with a code stored in the equipment, and if the entered code is correct, the equipment is activated.

Generally, in prior art security methods for automotive audio equipment, a user identification code of several digits is manually entered by various numeric keys on the front panel of the equipment, and if the identification code is correct, as a result of a comparison with a code stored in the equipment, the equipment is activated.

Consider a situation where audio equipment is stolen from a vehicle. The equipment is first removed from the first vehicle and is then installed for use in another car. That is, the equipment is once removed from a battery and connected to another battery. The condition of battery connection, that is, a change in the condition of battery connections of the two vehicles, is detected as a variation in power supply and when this condition is detected, the above security method prevents activation of the equipment and the equipment remains inactive until the correct identification code is manually entered. Therefore, if the equipment is stolen from the vehicle, the equipment cannot be operated by persons other than the user of the equipment who knows the secret identification code of the equipment. An indication or warning to the effect that such an anti-theft feature is incorporated in the audio equipment is visibly attached to the vehicle or the equipment so as to deter potential thieves. Such an indication or warning attached to the vehicle or the audio equipment, implying that it is futile to steal the equipment, discourages potential burglars that may be contemplating stealing the equipment, thus preventing the equipment from being stolen.

However, not all audio equipment is provided with a large number of numeric keys, and the fewer the number of numeric keys, the fewer the number of possible combinations that can be used to code an identification number, resulting in a lower security level. One way to avoid this would be to use keys other than numeric keys to create a secret identification code, but this would increase the complexity of operation. Furthermore, it is more difficult for the user to remember the identification code if non-numeric keys are used.

In view of the foregoing, a security system for audio equipment which uses a recording medium, such as a compact disc, as a key has been proposed as disclosed in Japanese Patent Application No. 2-333681 (Japanese Patent Unexamined Publication JPA 4-205965(1992)) in which a security method for audio equipment uses recorded voices on the recording medium. This security method for audio equipment is characterized in that the information recorded on the recording medium is compared with information stored in an internal memory of the audio equipment, and the audio equipment is activated depending on the result of the comparison. Since this method requires only that the audio equipment recognizes the recording medium that is to be used for releasing a security operation, it is easier for a user to remember the recording medium than a secret identification code. Furthermore, since an enormous number of recording media are available for use, its security level is very high.

However, when a recordable medium is used as the recording medium, there is a possibility that the information recorded on the recording medium may be rewritten and may no longer match the information stored in the audio equipment, thus making it impossible to release the security operation. For example, in an audio system that uses a photomagnetic disc called a mini disc which has recently come into widespread use, a rewritable disc may be used, and the above problem occurs in a security system for a playback apparatus or a playback/recording apparatus which uses such a mini disc.

It is accordingly an object of the present invention to provide a security system for audio equipment which allows users to easily release the security operation without compromising a security level, and which is prevented from being put in unlockable condition by careless handling.

SUMMARY OF THE INVENTION

The present invention provides a security system for audio equipment which prevents the audio equipment, which reproduces signals recorded on a recording medium, from being stolen. The audio equipment, while being in an inoperable condition, is changed into an operable condition when data recorded on a recording medium during a playback condition matches an identification data stored in a memory, the security system comprises a read-only memory (ROM) in which master data of a prescribed master recording medium has been recorded, and inoperativeness releasing means for putting the audio equipment which is under inoperable condition into operable condition when the data recorded in the recording medium put into playback condition matches the master data stored in the ROM.

Further the invention provides a security system comprising a ROM in which master data of a prescribed master recording medium has been recorded, and inoperativeness release control means for, when a mismatch between data recorded on the recording medium put in playback condition and the identification data has occurred more than a prescribed number of times in succession while the audio equipment is in inoperable condition, making it no longer possible to release the inoperable condition with an identification medium whose data matches the identification data and making it possible to put the audio equipment under inoperable condition into operable condition only when data recorded on the recording medium put in playback condition matches the master data stored in the ROM.

The invention further provides a security system comprising a second mode-change-over means for changing over the system to an identification medium cancel mode that allows identification data stored in the memory to be erased, and first identification data erasing means for erasing the identification data stored in the memory when a recording medium, in which the data matching the identification data stored in the memory is contained, is put into playback condition under the condition that the mode of the system has been changed over to the identification medium cancel mode by the second mode-change-over means.

Further, the invention is characterized in that the system further comprises second mode-change-over means for changing over the system to an identification medium cancel mode that allows identification data stored in the memory to be erased and second identification data erase means for erasing the identification data stored in the memory when the master recording medium in which the data matching the master data stored in the ROM is recorded is put into playback condition under the condition that the mode of the system has been changed over to the identification medium cancel mode by the second mode-change-over means.

Further, the invention is characterized in that the system further comprises identification data erase control means for, under the condition that the mode of the system has been changed over to the identification medium cancel mode by the second mode-change-over means, making it no longer possible to erase the data stored in the memory by the identification medium in which the data matching the identification data is recorded when mismatch between data stored in a recording medium put in playback condition and the identification data has been detected more than a prescribed number of times in succession and for making it possible to erase the identification data stored in the memory only when the data recorded on the recording medium in playback condition matches the master data stored in the ROM.

When the identification data is put into a condition possible to be stored into the memory by the first mode-change-over means, and in that state, a desired recording medium is put into playback condition, information recorded on the recording medium is stored in the memory and the recording medium is set as the recording medium possible to release the inoperable condition of the audio equipment. When identification data is already stored in the memory, new identification data will not be written over it, preventing the identification data from being accidentally overwritten.

Further, when a recording medium is inserted whose recorded data matches the master data non-erasably stored in the ROM, the audio equipment put in inoperable condition is made operable, thus making it possible to release the inoperable condition even when the recording medium whose data is stored in the memory is lost, for example.

To release the inoperable condition of the audio equipment, a recording medium is put into playback condition. However, when a recording medium whose data does not match the identification data stored in the memory is played back more than a prescribed number of times in succession, the inoperable condition of the audio equipment can not longer be released unless the master recording medium is used. This increases theft prevention capability.

Furthermore, when the equipment is set by the second mode-change-over means to a state that permits erasure of the identification data stored in the memory, and in that state, a recording medium whose identification data is stored in the memory is played back, the identification data stored in the memory is erased. The identification data stored in the memory can thus be erased and rewritten, which increases theft prevention capability and enhances easiness in operation.

It is also possible to erase and alter the identification data stored in the memory by inserting a recording medium whose recorded data matches the master data non-erasably stored in the ROM. This makes erasure and alteration of the identification data stored in the memory possible even when the recording medium whose identification data is stored in the memory is lost, for example. To erase the identification data stored in the memory, a recording medium is put into playback condition. However, when a recording medium whose data does not match the identification data stored in the memory is played back more than a prescribed number of times in succession, the identification data stored in the memory can be erased only by using the master recording medium. This increases theft prevention capability.

DETAILED DESCRIPTION OF THE PREFERRED EMBODIMENTS

An embodiment of the present invention will be described below with reference to drawings. In the embodiment described hereinafter, a digital audio disc player called a compact disc player is taken as an example, but it should be appreciated that the present invention is also applicable for other types of digital audio disc players such as a mini disc player, as well as digital audio tape players and the like.

Figure 8:
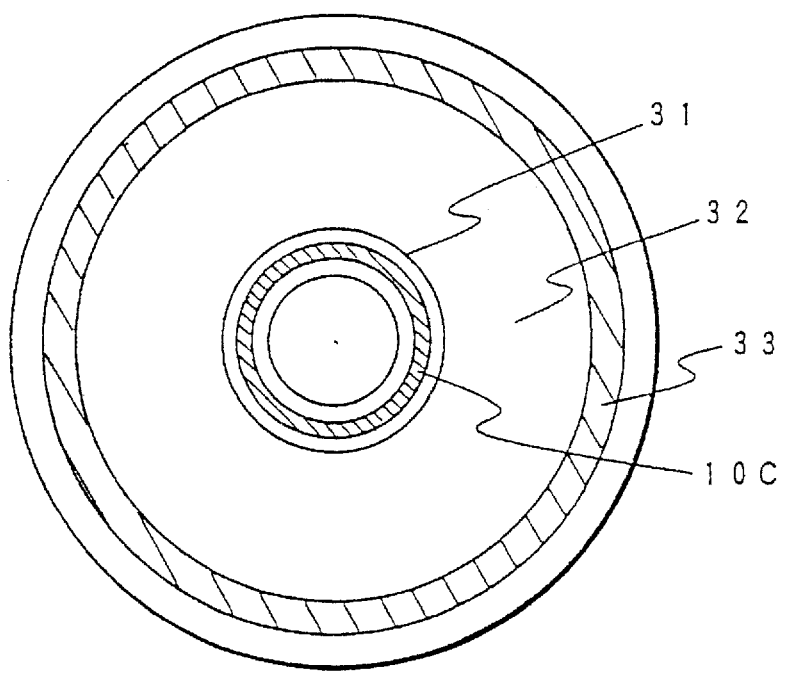
FIG. 8 is a diagram for explaining the recording format of a compact disc.

Before proceeding to a detailed description of an embodiment of the present invention, the signal recording format of compact discs will be described briefly. FIG. 8 shows a diagram for explaining the recording format of a compact disc.

As shown in FIG. 8, the compact disc has a lead-in area 31, a data area 32, and a lead-out area 33. Data specific to the particular disc (the number of music programs, start positions of programs, playing times, etc.), called TOC (Table Of Contents) data, are recorded in the lead-in area 31.

In the security method of the present embodiment, the user selects a particular compact disc and the contents (TOC data) recorded in the lead-in area 31 of the disc are written into a memory such as, for example, a rewritable ROM (EEPROM) or the like, contained in the audio equipment. The TOC data of the inserted compact disc is compared with the contents of the memory, and when they match, the audio equipment is made operable. Writing to the ROM is performed by using a ROM writer which is built in the audio equipment. Thus, by performing a prescribed operation, the contents recorded in the lead-in area 31 of the inserted compact disc are written into the ROM contained in the audio equipment.

Figure 1:
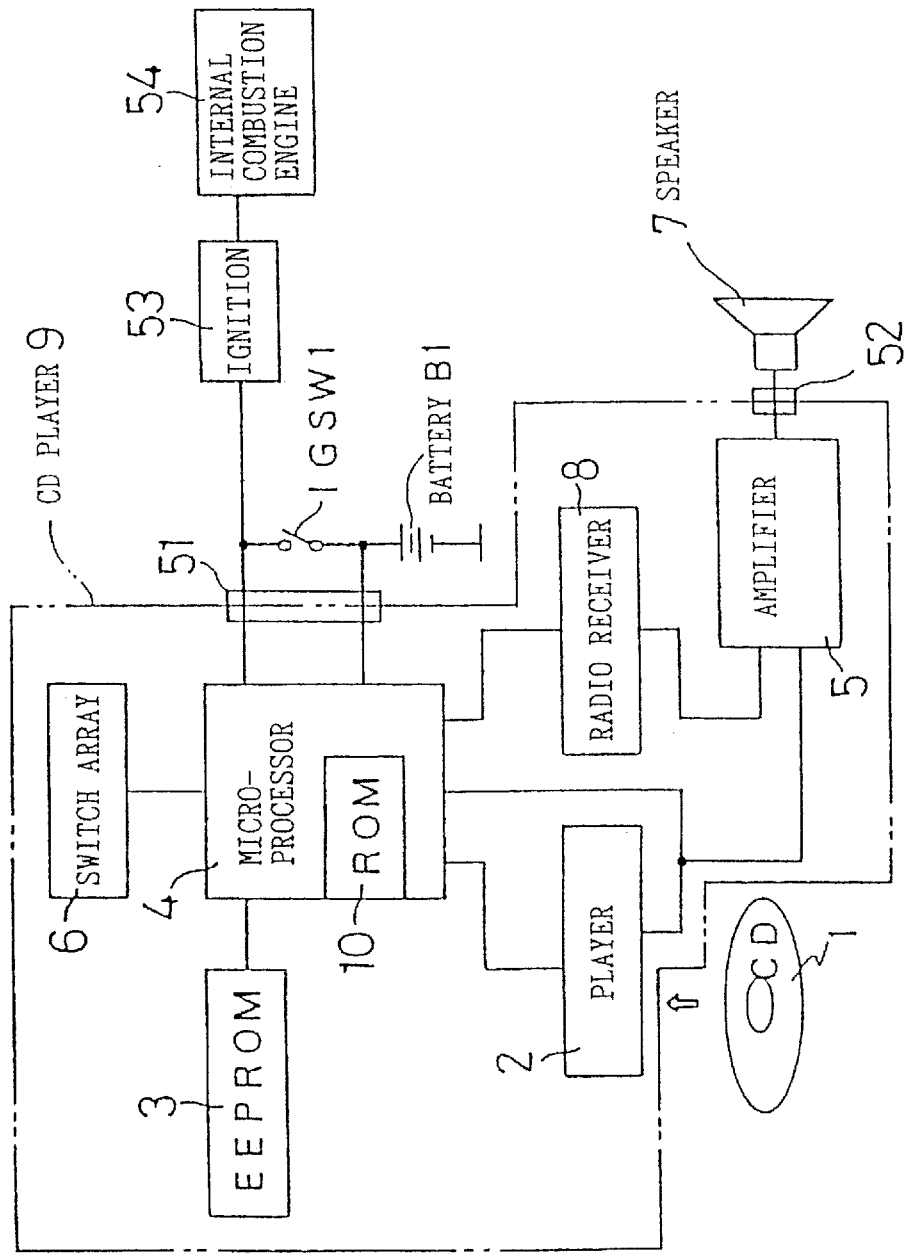
FIG. 1 is a diagram showing the configuration of audio equipment according to one embodiment of the present invention.

FIG. 1 shows a block diagram of audio equipment (a compact disc player with a built-in radio receiver) according to one embodiment of the present invention. The radio receiver and compact disc player 9 comprises: a player 2 which is used to read information from a compact disc 1, to play back audio signals, and to read lead-in information from the CD (compact disc); a radio receiver 8 for receiving radio broadcasts; an amplifier 5 for amplifying audio signals from the player 2 and from the radio receiver 8 and for outputting the amplified signals to a speaker 7; a microprocessor 4 for controlling the player 2, the radio receiver 8 and the amplifier 5, and for controlling security-related operations; and an electrically erasable programmable read-only memory (EEPROM) 3 for storing information that is used to release the security operation. The microprocessor 4 is directly connected to a battery on one end and via an ignition switch IGSW1 on another end. The microprocessor 4 monitors the condition of connection to the battery. The microprocessor 4 also contains a ROM (read-only memory) in which programs and the TOC contents of the master disc are stored.

The CD player 9 is mounted detachably, for example, in a console panel of a motor vehicle. Connectors 51 and 52 are respectively provided on a power line between the CD player 9 and the battery B and on a signal line between the CD player 9 and the speaker 7. When the CD player 9 is mounted in the console panel, the power line and the signal line are electrically connected by the connectors 51 and 52, respectively. When the CD player 9 is removed from the console panel, the power line and the signal line are disconnected at the connectors 51 and 52, respectively.

The EEPROM 3 is a memory that can electrically retain the stored contents without requiring a power supply.

When the driver of the vehicle turns on the ignition switch IGSW1, power from the battery B1 is supplied to an ignition circuit 53 which then impresses a pulse voltage to a spark ignition internal-combustion engine 54 to generate the spark for ignition.

Figure 2:
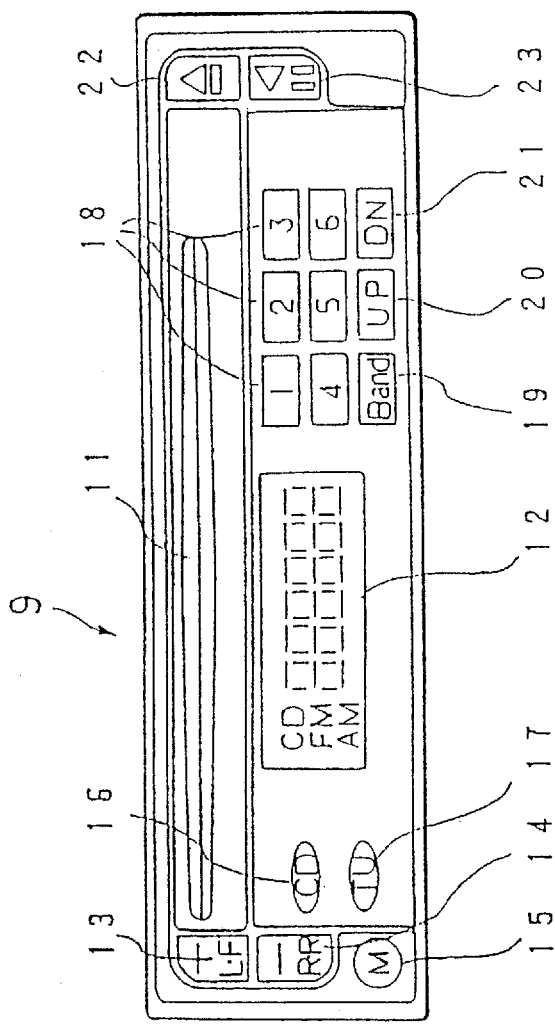
FIG. 2 is a diagram showing the arrangement of the front of automotive audio equipment according to one embodiment of the present invention.

Next, the operation of the audio equipment in one embodiment of the present invention will be described below. FIG. 2 is a schematic diagram showing the arrangement on the front of the automotive audio equipment (radio receiver and CD player with a built-in radio receiver).

A disc insertion slot 11 for insertion of a compact disc, a display section 12 for presenting various displays, and a plurality of switches for various operations are arranged on the front panel of the radio receiver and CD player 9 which has a built-in radio receiver.

The display section 12 displays information in accordance with the operation of the player 2 and the radio receiver 8 such as a number of music to play on the compact disc, playing time, volume, reception frequency, reception band (AM, FM), etc.

Reference numerals 13 and 14 are switches for adjusting the volume, tone, balance, and fader (front/rear balance). The desired item of adjustment (volume, tone, balance, or fader) is selected with a mode switch 15 and is increased or decreased by the adjusting switches 13 and 14. The desired item of adjustment changes each time the mode switch 15 is operated, and when the mode switch 15 is left unoperated for more than a predetermined time, the mode automatically returns to the volume adjustment mode.

Reference numerals 16 and 17 are source selection switches in which the player 2 is selected as the source of sound when the switch 16 is operated and the radio receiver 8 is selected when the switch 17 is operated.

Reference numeral 18 indicates an array of numeric switches which are used to select music programs during the operation of the player 2, and the numeric switches are also used to select preset radio stations during the operation of the radio receiver 8. For example, during the operation of the player 2, when the "3" numeric switch is operated, followed by a playback switch 23 described hereinafter, program No. 3 on the CD is played back. Likewise, during the operation of the radio receiver 8, when the "2" numeric switch is operated momentarily (for example, for less than 2 seconds), the reception frequency stored in the memory corresponding to the No. 2 numeric switch is read out of that memory and the radio receiver 8 is automatically tuned in to the designated frequency. On the other hand, when the "2" numeric switch is pressed and held down for a while (for example, for more than two seconds), the frequency currently being received is written into the memory corresponding to the "2" numeric switch.

Reference numeral 19 denotes a band selection switch which is used to switch between reception bands (AM and FM) of the radio receiver 8. Reference numerals 20 and 21 are UP and DOWN switches used to change the reception frequency. When the DOWN switch 20 is operated, the reception frequency decreases, and when the UP switch 21 is operated, the reception frequency increases.

Reference numeral 22 denotes an eject switch which, when operated, the compact disc loaded in the player 2 is ejected through the disc insertion slot 11. Reference numeral 23 is a play switch for the player 2, and when this switch is operated during the playback of a compact disc, the playback stops, and when it is operated while the playback is being stopped, the playback of the compact disc starts again.

Next, description is made of the security-related operations for the audio equipment according to the above embodiment of the present invention.

SECURITY OPERATION

When the CD player 9 with a built-in radio receiver, while being set in a security mode, is removed from a vehicle and installed in another vehicle, the security function is activated. In other words, when the CD player 9, with a built-in radio receiver, is set in the security mode, is once removed from the battery and then connected again to the battery, the security function is activated. More specifically, when the microprocessor 4 has detected a change in the battery connection condition, that is the change of battery connection condition from a variation in power supply thereby detecting removed condition of the CD player 9, the security system is activated. Once the security system is activated, the CD player 9 with a built-in radio receiver is inoperable. That is, the microprocessor 4 does not accept any switch operation except a prescribed operation of designated switches.

To release this inoperable condition, a designated disc set by the user must be inserted or the CD player 9 with a built-in radio receiver must be taken to the manufacturer or dealer where a master disc is maintained and is inserted, so as to release the inoperable condition and make the CD player 9 with a built-in radio receiver operable.

More specifically, when the CD player 9 with a built-in radio receiver is once removed from the battery while it is set in the security mode (the TOC data of the identification (ID) disc is stored in the EEPROM 3 in the CD player 9 with a built-in radio receiver), and if power is turned on again, the CD player 9 with a built-in radio receiver cannot be operated and the display section 12 presents a display to the effect that the equipment is inoperable due to the activation of the security system ("SEC" illuminates for two seconds). Then, an indication requesting disc insertion appears ("DISC" stays lit until a disc is inserted). When the ID disc is inserted through the disc insertion slot 11, the security function is released, and an indication indicating that the CD player 9 with a built-in radio receiver is now made operable appears ("OK" illuminates for two seconds), after which the disc is ejected and the equipment enters a normal operation mode (for operation of the player 2 or the radio receiver 8).

On the other hand, when a compact disc other than the ID disc (or a disc whose TOC data cannot be read correctly) is inserted through the disc insertion slot 11, the display section 12 displays the unreadable condition along with the number of times that the disc has been inserted ("ERR n" illuminates for two seconds), after which the disc is ejected and the indication requesting disc insertion appears once again ("DISC" stays lit until a disc is inserted).

When compact discs other than the ID disc have been inserted through the disc insertion slot 11 five times in succession, the display section 12 then presents an indication requesting the user to recheck whether the compact discs inserted are the ID disc ("COOL" stays lit for one hour after the equipment was reconnected to the battery), after which the disc is ejected once and (when one hour has elapsed after reconnection to the battery) the indication requesting disc insertion appears once again ("DISC" stays lit until the disc is inserted). In this case, if designated switches are operated in a specified manner (the source selection switch 16 and the "1" and the "2" numeric switches 18 are depressed simultaneously), an indication indicating the faulty condition and suggesting that the equipment be taken to the dealer is displayed ("HELP" stays lit until power is turned off), and the ID disc cancel mode is terminated. Since the waiting time before the ID disc can be inserted for the sixth time is long, the user may decide that he cannot wait that long time and may give up trying to release the inoperable condition by himself after attempting five times. The above arrangement is made so as to encourage the user to let the dealer immediately release the inoperable condition.

Further, when compact discs other than the ID disc have been inserted through the disc insertion slot 11 ten times in succession, again the indication indicating the faulty condition and suggesting that the equipment be taken to the dealer is displayed ("HELP" stays lit until power is turned off), and the ID disc cancel mode is terminated.

Once the indication of the faulty condition and suggestion that the equipment be taken to the dealer is displayed, the CD player 9 with a built-in radio receiver remains inoperable even if the power is turned off, and the inoperable condition cannot be released unless a release operation is performed using the master disc at the dealer. That is, the insertion of discs other than the ID disk is treated as a simple mistake on the user's side up to nine times, but when the attempt has failed for the tenth time in succession, the attempt is judged as being an act by a burglar. This arrangement enhances theft prevention performance.

SETTING OF SECURITY MODE AND SETTING OF ID DISC

The security mode is set by the user for writing the TOC data of the identification (ID) disc into the EEPROM 3 contained in the CD player 9 with a built-in radio receiver (ID disc setting operation). That is, the microprocessor 4 determines whether or not the equipment is set in the security mode, by checking whether or not data is stored in the EEPROM 3 (i.e., whether it is in the initial condition (usually, "0" is stored)). The ID disc setting operation is performed by first setting the mode to the ID disc setting mode by performing a prescribed operation when power is turned on to the CD player 9 with a built-in radio receiver, and then inserting a compact disc to be used as the ID disc through the disc insertion slot 11 in accordance with the indication displayed on the display section 12 of the CD player 9 with a built-in radio receiver.

More specifically, at power on, first the source selection switch 16 and the "1" numeric switch 18 are depressed simultaneously to enter the security setting mode, upon which the display section 12 presents a display indicating that the security setting mode has been entered ("SEC" illuminates for two seconds), and if any compact disc is already loaded, that compact disc is ejected. Next, an indication which requests disc insertion is displayed ("DISC" stays lit until a disc is inserted). When the compact disc to be set as the ID disc is inserted through the disc insertion slot 11, the TOC data of the compact disc is read and written into the EEPROM 3 as identification data. After an indication that the completion of the ID disc setting operation is displayed ("SEC" illuminates for two seconds), the disc is ejected once and the ID disc setting mode is terminated. The equipment then enters a normal operation mode (for operation of the player 2 or the radio receiver 8).

When a compact disc not suitable for the ID disc, for example a compact disc whose TOC data cannot be read due to scratches, has been inserted as an attempt to set it as the ID disc, that is, when TOC data has not been able to be read from the compact disc inserted in the disc insertion slot 11, an indication of the unreadable condition is displayed on the display section 12 ("ERR" illuminates for two seconds) at the first attempt, after which the disc is ejected and the indication requesting disc insertion appears once again ("DISC" stays lit until a disc is inserted).

If the TOC data read failure has occurred twice in succession, an indication requesting a disc change is displayed on the display section 12 ("CHANGE" illuminates for two seconds), after which the disc is ejected and the indication requesting disc insertion appears once again ("DISC" stays lit until the disc is inserted).

CLEARING THE SECURITY MODE

The security mode is cleared by erasing (initializing) the identification data stored in the EEPROM 3. That is, the microprocessor 4 erases the identification data stored in the EEPROM 3 when a prescribed operation is performed. The prescribed operation is accomplished by first setting the mode to an ID disc cancel mode by performing a designated operation when power is turned on to the CD player 9 with a built-in radio receiver, and then inserting the previously set ID disc or the master disc maintained at the dealer through the disc insertion slot 11 in accordance with the indication on the display section 12 of the CD player 9 with a built-in radio receiver.

More specifically, at power on, first the source selection switch 16 and the numeric switch "2" are depressed simultaneously to enter the security cancel mode, upon which the display section 12 presents an indication that the security cancel mode has been entered ("SEC" illuminates for two seconds), and if any compact disc is already loaded, that compact disc is ejected. Next, an indication requesting disc insertion is displayed ("DISC" stays lit until a disc is inserted). When the ID disc (or the master disc) is inserted through the disc insertion slot 11, the TOC data written in the EEPROM 3 is erased. After an indication indicating the completion of the ID disc cancel operation is displayed ("CANCEL" illuminates for two seconds), the disc is ejected once and the ID disc cancel mode is terminated. The equipment then enters a normal operation mode (for operation of the player 2 or the radio receiver 8).

On the other hand, when a compact disc other than the ID disc (or a disc whose TOC data cannot be read correctly) is inserted through the disc insertion slot 11, the display section 12 displays the unreadable condition along with the number of times that the disc has been inserted ("ERR n" illuminates for two seconds), after which the disc is ejected once and an indication requesting disc insertion appears once again ("DISC" stays lit until a disc is inserted).

When compact discs other than the ID disc have been inserted through the disc insertion slot 11 five times in succession, the display section 12 then presents an indication requesting the user to recheck whether any of the compact discs inserted are the ID disc ("COOL" flashes five times), after which the disc is ejected once and the indication requesting disc insertion appears once again ("DISC" stays lit until a disc is inserted).

Further, when compact discs other than the ID disc have been inserted through the disc insertion slot 11 ten times in succession, an indication indicating the faulty condition and a suggestion that the equipment be taken to the dealer is displayed ("HELP" stays lit until power is turned off), and the ID disc cancel mode is terminated.

Also, the CD player 9 with a built-in radio receiver remains inoperable even if the power is turned off once, and the inoperable condition cannot be released unless a release operation is performed using the master disc maintained at the dealer. That is, the insertion of discs other than the ID disk is treated as a simple mistake on the user's side up to nine times. but when the attempt has failed for the tenth time in succession, the attempt is judged as being an act by a burglar. This arrangement enhances theft prevention performance.

MASTER INPUT MODE (RELEASE OF INOPERABLE CONDITION AT DEALER)

Once the indication of the faulty condition and suggestion that the equipment be taken to the dealer ("HELP" stays lit until power is turned off) has been presented on the display section 12 after failing to clear the security mode or after failing to release the inoperable condition, the inoperable condition can be released only by inserting the master disc maintained at the dealer through the disc insertion slot. In this case, the security mode is also cleared. That is, the data stored in the EEPROM 3 is erased.

Specifically, at power on, an indication indicating that the master input mode has been entered is displayed on the display section 12 ("HELP" illuminates). By performing a prescribed operation (simultaneous depression of the source selection switch 16 and the "3" and "4" numeric switches 18), the inoperable condition can be released by using the master disc, and an indication requesting insertion of the master disc is displayed ("DISC" keeps flashing until the disc is inserted). When the master disc is inserted through the disc insertion slot 11, the inoperable condition of the CD player 9 with a radio receiver is released, and at the same time, the TOC data written in the EEPROM 3 is erased. After an indication of the completion of the inoperable condition releasing operation is displayed ("OK" illuminates for two seconds), the disc is ejected once and the master disc input mode is terminated. The equipment then enters a normal operation mode (for operation of the player 2 or the radio receiver 8).

On the other hand, if a disc other than the master disc is inserted through the disc insertion slot 11, the display section 12 displays the unreadable condition along with the number of times that the disc has been inserted ("ERR n" illuminates for two seconds), after which the disc is ejected once and the display requesting disc insertion appears once again ("DISC" keeps flashing until a disc is inserted).

Further, when compact discs other than the ID disc have been inserted through the disc insertion slot 11 for an integral multiple of 5 times (5 times, 10 times, . . . ) in succession, the condition returns to the same condition as at power on, and the display 12 once again displays the indication that the master input mode has been entered ("HELP" illuminates), requiring that the prescribed operation be performed once again if the inoperable condition is to be released.

Next, description is made of the processing that the microprocessor 4 carries out to accomplish the above-described operations.

Figure 3:
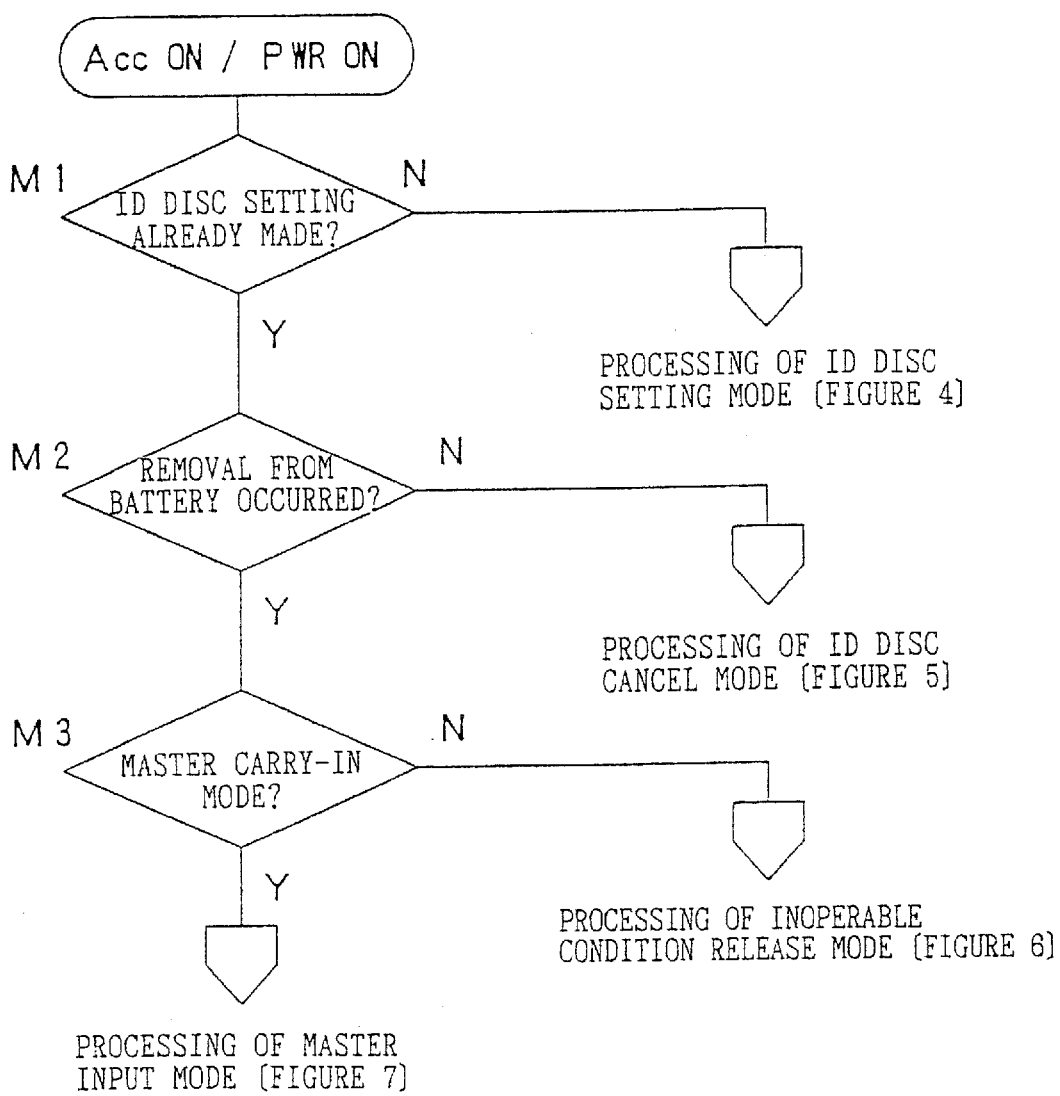
FIG. 3 is a flowchart illustrating a main routine of different modes of operation.

FIG. 3 is a flowchart illustrating the main routine of the processing that the microprocessor 4 performs. When the CD player 9 with a built-in radio receiver is put into operation by turning on the accessory switch of a vehicle (by operating the ignition switch), or by turning on the power switch on the CD player 9 with a built-in radio receiver, the process is started and the operation first proceeds to step M1.

In step M1, a decision is made as to whether or not an ID disc setting has already been performed. If no ID disc setting has yet been performed, a branch is made to the processing of the ID disc setting mode. If there already exists a valid ID disc setting, the process moves to step M2. This aforementioned decision is made based on whether the TOC data of the ID disc is stored in the EEPROM 3.

In step M2, a decision is made as to whether the connection between the CD player 9 with a built-in radio receiver and the battery B has ever been cut off. If the answer to the decision is NO, a branch is made to the processing of the ID disc cancel mode. If the answer is YES, the process proceeds to step M3. This decision is made by the microprocessor 4 which monitors the voltage across the connection terminals with the battery B and acknowledges a voltage drop condition if any voltage drop is detected.

In step M3, a decision is made as to whether the mode is the master carry-in mode. If it is not the master carry-in mode, a branch is made to the processing of the inoperable condition releasing mode. If it is the master carry-in mode, a branch is made to the processing of the master input processing mode. This decision is made by the microprocessor 4 which acknowledges a failure of inoperable condition releasing operation, a failure of ID disc cancel operation, etc.

When the CD player 9 with a built-in radio receiver has been placed in operation with the above processing, (a) If the ID disc is not set, a branch is made to the processing of the ID setting mode, (b) If the ID disc is set and if no disconnection of the CD player 9 with a built-in radio receiver from the battery B has been detected, a branch is made to the processing of the ID disc cancel mode, (c) If the ID disc is set, if a disconnection of the CD player 9 with a built-in radio receiver from the battery B has ever been detected, and if the mode is not the master carry-in mode, a branch is made to the processing of the inoperable condition releasing mode, (d) If the mode is the master carry-in mode, a branch is made to the processing of the master input processing mode.

Figure 4:
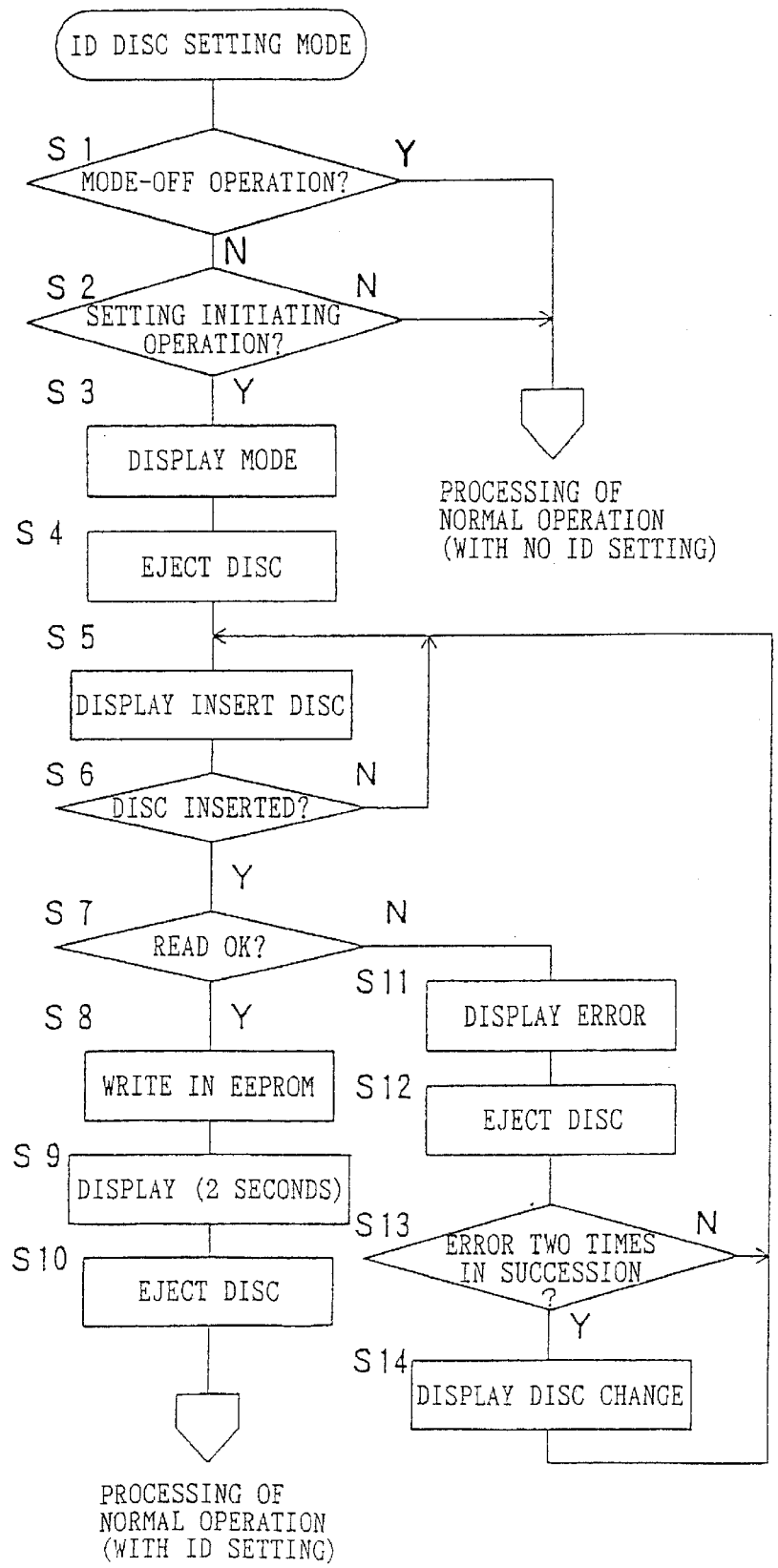
FIG. 4 is a flowchart illustrating the processing of an ID disc setting mode.

Next, the processing of the ID disc setting mode (which also includes the security mode setting processing) will be described. FIG. 4 is a flowchart illustrating the processing of the ID disc setting mode that the microprocessor 4 performs.

When a branch is made from the main routine to the processing of the ID disc setting mode, the processing starts and proceeds to step S1 where a decision is made as to whether a mode-off operation has been performed. A mode-off operation is an operation other than setting initiating operations, and refers to any normal operation of the CD player 9 with a built-in radio receiver, such as the operation of the source selection switches 16, 17, play switch 23, or the inserting operation of a compact disc into the disc insertion slot 11 etc. If it is decided that a mode-off operation has been performed, the ID disc setting operation (data writing to the EEPROM 3) is skipped, and the process moves to the processing of the normal operation to control the operation of the player 2 and the radio receiver 8. Otherwise, the process moves to step S2.

In step S2, a decision is made as to whether an ID disc setting initiating operation has been performed. If the answer to the decision is YES, the process proceeds to step S3. If the answer is NO, the operation proceeds to the processing of the normal operation. The ID disc setting initiating operation is performed by operating designated switches in a prescribed manner. In this embodiment, as previously described, simultaneous depression of the source selection switch 16 and the "1" numeric switch 18 constitutes the ID disc setting initiating operation. Decisions in steps S1 and S2 are made by performing interrupt processing to detect the operation of the various switches or the inserting operation of a compact disc into the disc insertion slot 11. With these interrupts, the process moves to the next step.

In step S3, an indication that the ID disc setting mode has been entered is displayed ("SEC" illuminates for two seconds), after which the process proceeds to step S4. In step S4, if any disc is already loaded in the player 2, the disc is ejected. In step S5, an indication ("DISC") directing the insertion of a compact disc is displayed, and the processing in step S5 and S6 is repeated until it is judged in step S6 that a compact disc has been inserted. When a compact disc has been inserted, the process moves to step S7, where a decision is made as to whether the TOC data of the inserted compact disc can be read correctly. That is, whether the compact disc is suitable for the ID disc. If the data can be read correctly, the process moves to step S8. Otherwise, the process moves to step S11.

In step S8, the TOC data of the compact disc is written into the EEPROM 3 as the identification data. Then, in step S9, an indication of the completion of the ID disc setting operation is displayed ("SEC" illuminates for two seconds), and in step S10, the compact disc is ejected, after which the process moves to the processing of the normal operation.

On the other hand, in step S11, an indication that the TOC data of the compact disc cannot be read correctly is displayed ("ERR" illuminates for two seconds), and in step S12, the compact disc is ejected, after which the process moves to step S13.

In step S13, it is judged whether the TOC data reading has failed twice in succession. If it has failed twice in succession, then the disc is judged as being unsuitable for the ID disc because of scratches or the like, and the process moves to step S14, where an indication requesting a disc change is displayed ("CHANGE" illuminates for two seconds). If the reading failure is not the second occurrence in succession, the process returns to step S5 to repeat the processing.

Figure 5:
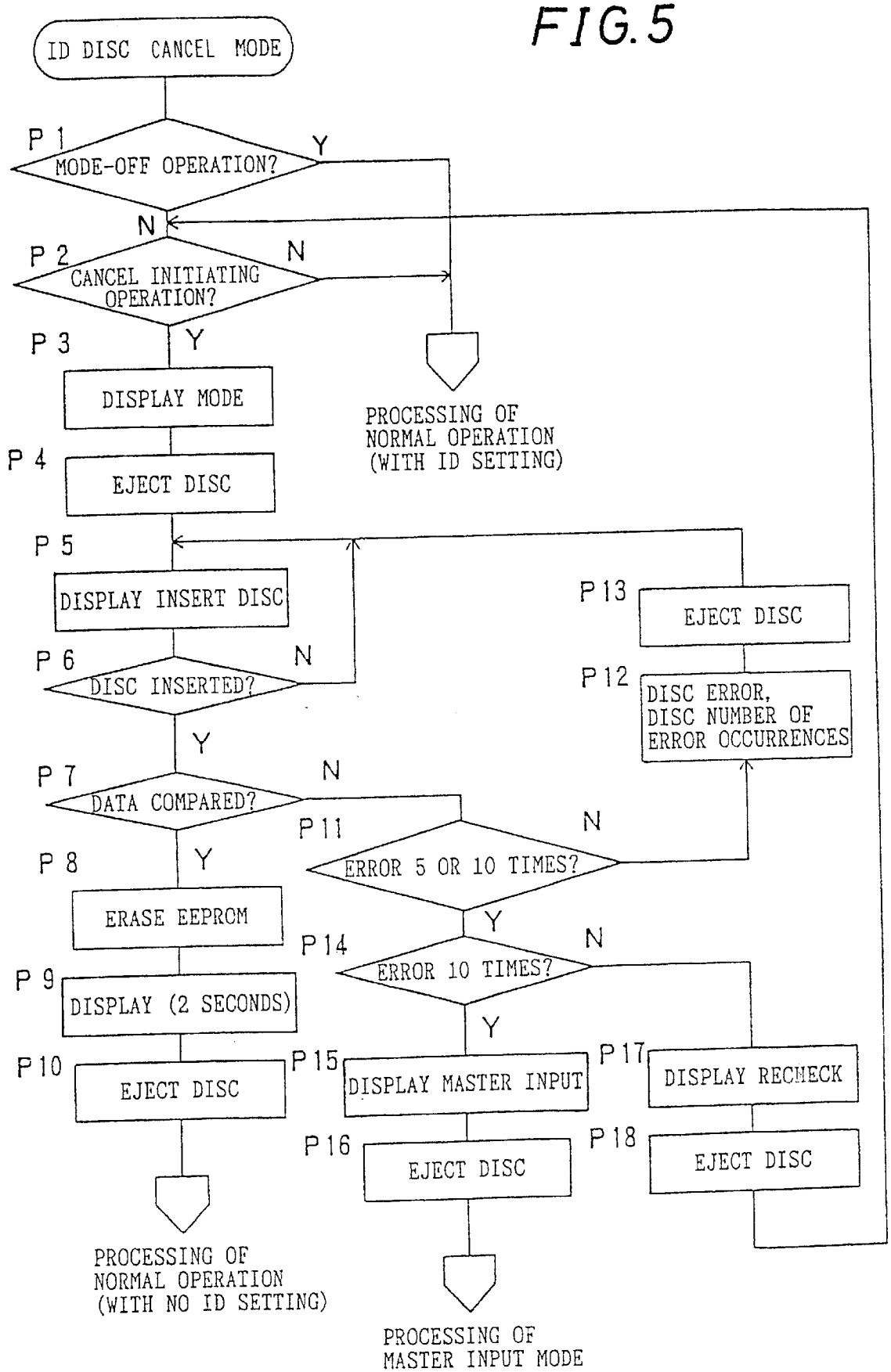
FIG. 5 is a flowchart illustrating the processing of an ID disc cancel mode.

Next, the processing of the ID disc cancel mode (which also includes the security operation mode releasing operation) will be described. FIG. 5 is a flowchart illustrating the processing of the ID disc cancel mode that is performed by the microprocessor 4.

When a branch is made from the main routine to the processing of the ID disc cancel mode, the processing starts with step P1 where a decision is made as to whether a mode-off operation has been performed. A mode-off operation, as described in the processing of the ID disc setting mode, is an operation other than setting initiating operations, and refers to any normal operation of the CD player 9 with a built-in radio receiver, such as the operation of the source selection switches 16, 17, play switch 23, or the inserting operation of a compact disc into the disc insertion slot 11. If it is decided that a mode-off operation has been performed, the ID disc cancel operation (erasure of data in the EEPROM 3) is skipped, and the process moves to the processing of the normal operation to control the operation of the player 2 and the radio receiver 8. Otherwise, the process proceeds to step S2.

In step P2, a decision is made as to whether an ID disc cancel initiating operation has been performed. If the answer to the decision is YES, the process moves to step P3. If the answer is NO, the operation proceeds to the processing of the normal operation. The ID disc cancel initiating operation is performed by operating designated switches in a prescribed manner. In this embodiment, as previously described, simultaneous depression of the source selection switch 16 and the "2" numeric switch 18 constitutes the ID disc cancel initiating operation. Decisions in steps P1 and P2 are made by servicing interrupts to detect the operation of the various switches or the inserting operation of a compact disc into the disc insertion slot 11. With these interrupts, the process moves to the appropriate processing.

In step P3, an indication that the ID disc cancel mode has been entered is displayed ("SEC" illuminates for two seconds), after which the process moves to step P4. In step P4, any disc that is already loaded in the player 2 is ejected. In step P5, an indication ("DISC") directing a user to insert a compact disc is displayed, and the processing in step P5 and P6 is repeated until a determination is made in step P6 that a compact disc has been inserted. When a compact disc has been inserted, the process moves to step P7, where a decision is made as to whether or not the TOC data of the inserted compact disc matches the TOC data (the TOC data of the ID disc) stored in the EEPROM 3 or the master disc TOC data permanently stored in the ROM of the microprocessor 4. If the TOC data matches, the process moves to step P8 to erase the data stored in the EEPROM 3. Then, in step P9, an indication that the completion of the ID disc cancel operation is displayed ("CANCEL" illuminates for two seconds), and in step P10, the compact disc is ejected. Then the process moves to normal operation processing.

In step P11, a determination is made as to whether a TOC data mismatch has occurred five times or ten times in succession, and in step P14, it is determined whether a TOC data mismatch has occurred ten times in succession. If the occurrence of TOC data mismatch is the tenth time in succession, the process moves to step P15, where an indication of the faulty condition and suggestion that the equipment be taken to the dealer is displayed ("HELP" stays lit until power is turned off). Then, in step P16, the compact disc is ejected and the process moves to the processing of the master input mode.

On the other hand, if the occurrence of TOC data mismatch is the fifth time in succession, the process moves to step P17, where an indication requesting the user to recheck whether the compact disc inserted is the ID disc is displayed ("COOL" flashes five times). Then, in step P18, the compact disc is ejected and the process returns to step P2 to repeat the processing.

If the number of occurrences of the TOC data mismatch is neither 5 or 10 times in succession, the process moves to step Q9, where an indication of the unreadable condition or indication that the inserted disc is not the ID disc and also indication of the number of occurrences, is displayed ("ERR n" illuminates for two seconds). Then, in step P13, the compact disc is ejected and the process returns to step P5 to repeat the processing.

Figure 6:
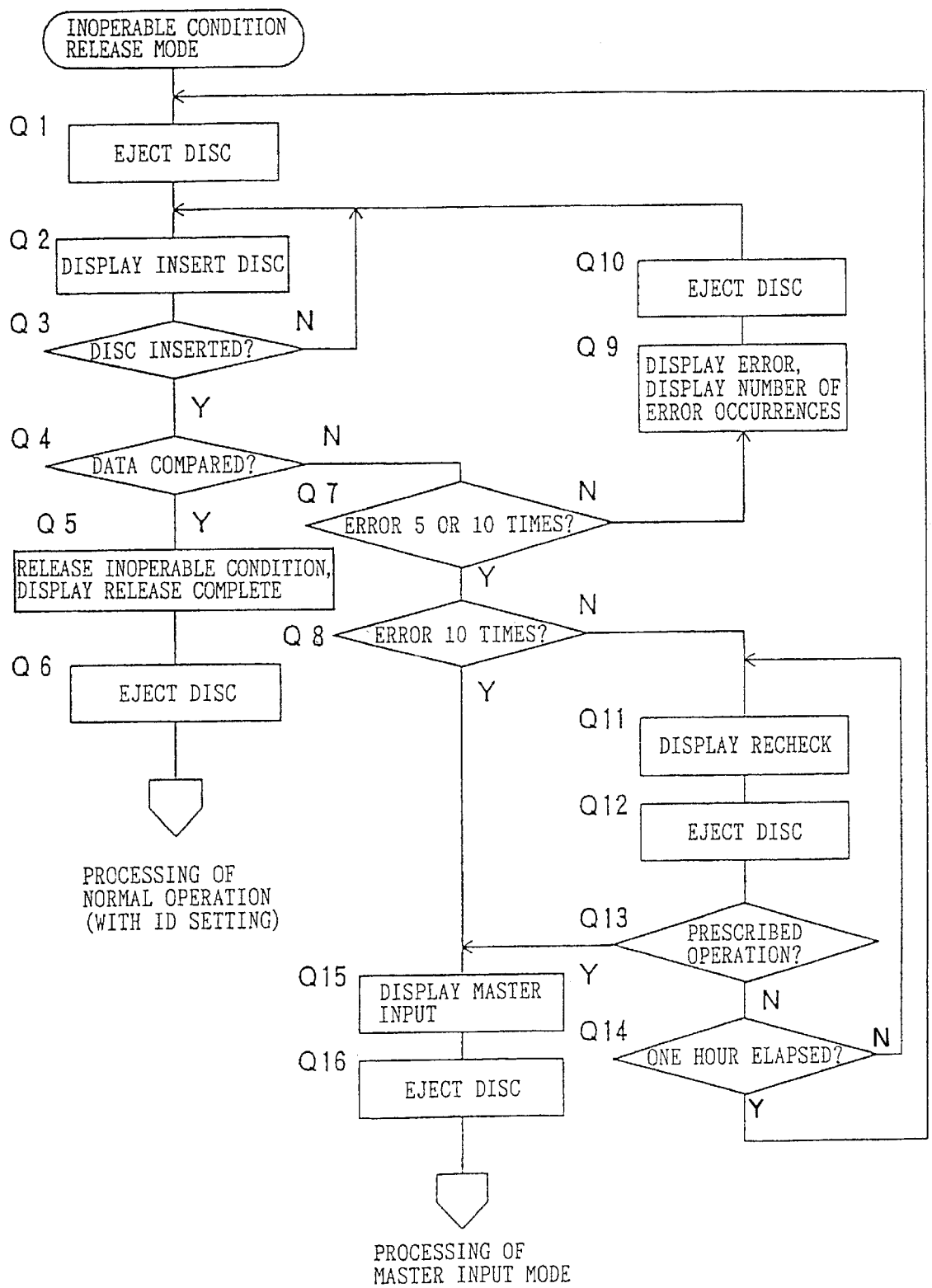
FIG. 6 is a flowchart illustrating the processing of an inoperable condition release mode.

Next, the processing of the inoperable condition releasing mode will be described. FIG. 6 is a flowchart illustrating the processing of the inoperable condition releasing mode that is performed by the microprocessor 4.

When a branch is made from the main routine to the processing of the inoperable condition releasing mode, the processing starts with step Q1 where any disc which is already loaded in the player 2 is ejected. In step Q2, an indication directing the insertion of a compact disc is displayed ("DISC" illuminates), and the processing in step Q2 and Q3 is repeated until it is determined in step Q3 that a compact disc has been inserted. When a compact disc has been inserted, the process moves to step Q4, where a decision is made as to whether or not the TOC data of the inserted compact disc matches the TOC data (the TOC data of the ID disc) stored in the EEPROM 3 or the master disc TOC data non-erasably and permanently stored in the ROM of the microprocessor 4. If the TOC data matches, the process moves to step Q5 to release the inoperable condition (by erasing the memory that retains the removal from the battery B), and an indication that the completion of the inoperable condition releasing operation has been reached is displayed ("OK" illuminates for two seconds). Then, the compact disc is ejected in step Q6, after which the process moves to the processing of the normal operation.

In step Q7, determination is made as to whether the TOC data mismatch has occurred five times or ten times in succession, and in step Q8, it is determined whether the TOC data mismatch has occurred ten times in succession. If the occurrence of the TOC data mismatch is the tenth time in succession, the process moves to step Q15, where an indication of the faulty condition and suggestion that the equipment be taken to the dealer is displayed ("HELP" stays lit until power is turned off). Then, the compact disc is ejected in step Q16, after which the process moves to the processing of the master input mode.

On the other hand, if the occurrence of the TOC data mismatch is the fifth time in succession, the process moves to step Q11, where an indication requesting the user to recheck whether the compact disc inserted is the ID disc is displayed ("COOL" flashes five times). Then, the compact disc is ejected in step Q12. In step Q13, a decision is made as to whether an operation for forced transfer to the master input mode has been performed. If the answer to the decision is YES, the process moves to step Q15. Otherwise, the process moves to step Q14, where a determination is made as to whether one hour has elapsed since the CD player 9 with a built-in radio receiver was reconnected to the battery B. The processing in steps Q11 to Q13 is repeated until one hour has elapsed. When one hour has elapsed, the process returns to step Q1 to repeat the processing. The operation for forced transfer to the master input mode is performed by operating designated switches in a prescribed manner. In this embodiment, as previously described, simultaneous depression of the source selection switch 16 and the "1" and the "2" numeric switches 18 constitutes the operation for forced transfer to the master input mode.

If the number of occurrences of the TOC data mismatch is neither 5 nor 10 in succession, the process moves to step P12, where an indication that the unreadable condition or indication that the inserted disc is not the ID disc and also an indication of the number of occurrences is displayed ("ERR n" illuminates for two seconds). Then, the compact disc is ejected in step Q10, and the process returns to step Q2 to repeat the processing.

Figure 7:
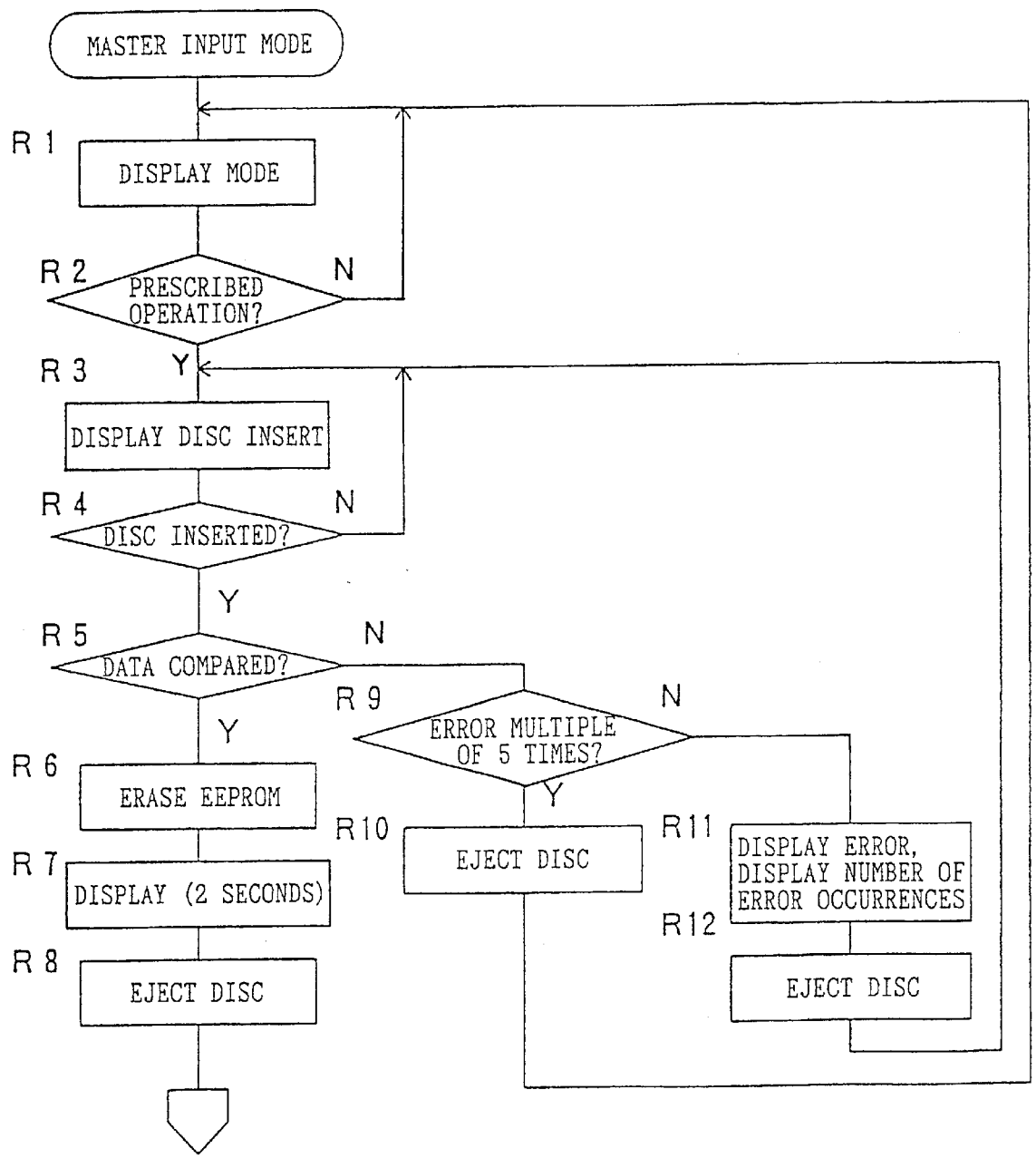
FIG. 7 is a flowchart illustrating the processing of a master input mode.

Next, the processing of the master input mode will be described. FIG. 7 is a flowchart illustrating the processing of the master input mode that is performed by the microprocessor 4.

When a branch is made from the main routine to the processing of the master input mode, the processing starts with step R1 where an indication that the master input mode has been entered is displayed ("HELP" illuminates for two seconds). Then, the process moves to step R2.

In step R2, a decision is made as to whether a master input initiating operation has been performed. If the answer to the decision is YES, the process moves to step R3. Otherwise, the processing in steps R1 and R2 is repeated until the initiating operation has been performed. The master input initiating operation is performed by operating designated switches in a prescribed manner. In this embodiment, as previously described, simultaneous depression of the source selection switch 16 and the "3" and "4" numeric switches 18 constitutes the master input initiating operation.

In step R3, any disc which is already loaded in the player 2 is ejected. In step R3, an indication ("DISC") directing the insertion of a compact disc is displayed, and the processing in step R3 and R4 is repeated until it is judged in step R4 that a compact disc has been inserted. When a compact disc has been inserted, the process moves to step R5.

In step R5, a decision is made as to whether or not the TOC data of the inserted compact disc matches the master disc TOC data which is permanently stored in the ROM of the microprocessor 4. If the TOC data matches, the process moves to step R6 to erase the data stored in the EEPROM 3. In step R7, an indication of the completion of the master input processing is displayed ("OK" illuminates for two seconds). Then, the compact disc is ejected in step R8, after which the process moves to the processing of the normal operation.

If the TOC data does not match, the process moves to step R9 to determine whether a TOC data mismatch has occurred an integral multiple of 5 times in succession. If the TOC data mismatch has occurred an integral multiple of 5 times in succession, the process moves to step R10, where the compact disc is ejected and, after which, the process returns to step R1 to repeat the processing. On the other hand, if the number of occurrences of TOC data mismatch is not an integral multiple of 5 times in succession, the process proceeds to step R10, where an indication of the unreadable condition or an indication that the inserted disc is not the master disc and also an indication of the number of occurrences is displayed ("ERR n" illuminates for two seconds). Then, the compact disc is ejected in step P12, and the process returns to step R3 to repeat the processing.

With the above processing, the security operation, the setting of security mode (ID disc setting), releasing of the security mode (ID disc cancel), can be accomplished.

As described in detail above for the present embodiment, an anti-theft system for an automotive CD player with a built-in radio receiver is constructed using a compact disc itself as the key. This construction achieves an easy-to-operate anti-theft system free from the inconvenience associated with the use of a secret identification code.

In the present embodiment, only one ID disc can be set, but it is also possible to increase the anti-theft performance by making provisions so that a plurality of ID discs can be set and so that the inoperable condition, the security mode, cannot be released until all the ID discs have been inserted in the player 2. Alternatively, provisions may be made so that the inoperable condition, the security mode, can be released by inserting any one of the plurality of ID discs. In this case, for example, each authorized user of a vehicle maintains one of the ID discs and, by using the ID disc each user maintains, the user can release the inoperable condition. Such functional modifications can be achieved by making minor modifications to the portion of the processing contents of the microprocessor 4 which is responsible for the ID disc setting and to the portion which is responsible for matching the inserted compact disc against the TOC data stored in the EEPROM 3.

Before proceeding to a detailed description of another embodiment of the invention, the signal recording format of the mini disc will be described briefly. FIG. 16 is a diagram for illustrating the recording format of the mini disc.

Figure 16A:
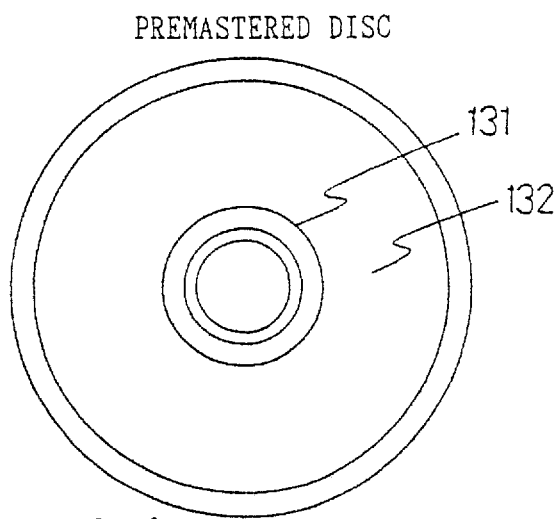
FIG. 16 is a diagram for explaining the recording format of a mini disc.
Figure 16B:
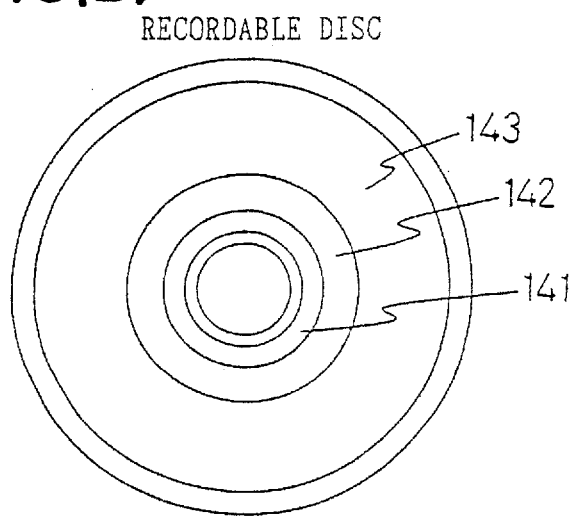
Figure 16C:
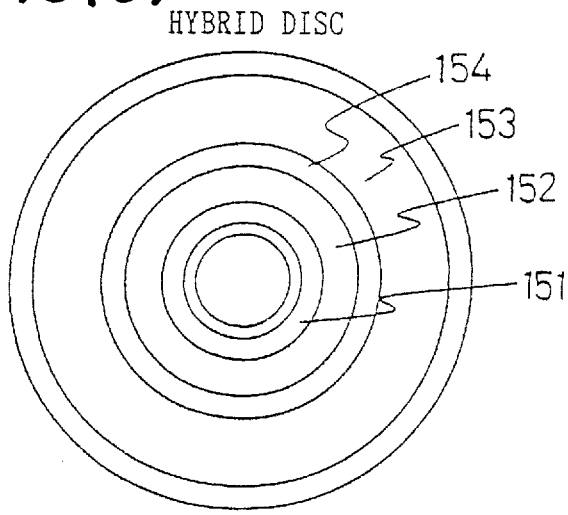

There are three basic types of mini discs: a playback-only premastered disc which cannot be rewritten (FIG. 16(A)); a recordable disc which allows writing and rewriting (FIG. 16(B)); and a hybrid disc which is partially not-rewritable and partially writable and rewritable (FIG. 16(C)).

The premastered disc comprises a lead-in area 131 and a data area 132, as shown in FIG. 16(A). The TOC (Table Of Contents) data and the data specific to the disc (number of music programs, start positions of programs, playing times, etc.), are recorded in the lead-in area 131. Data such as music is recorded in the data area 132. To produce the premastered disc, a mold called a stamper is used and a resin (polycarbonate or the like) is injection molded to form a disc (including pits and lands on the signal surface). Then aluminum or the like is evaporated on the disc surface so as to provide a reflective film. The disc is therefore not-writable and not-rewritable.

The recordable disc has a lead-in area 141, a user TOC area 142, and a data area 143, as shown in FIG. 16(B). In the lead-in area 141, data indicating the positions of the user TOC area 142 and the writable and rewritable data area 143 and data indicating that the disc is a recordable disc are recorded using a manufacturing process similar to that of the premastered disc. Such data, however, is substantially the same on all recordable discs and cannot be used as data to identify a particular disc. Data recorded by a user is stored in the data area 143, and the user TOC data (number of music programs, start positions of music programs, playing times, etc.) for the data recorded in the data area 143 is recorded in the user TOC area 142. A magnetic film is formed on the user TOC area 142 and data area 143. By applying a magnetic field and illuminating laser light, magnetism is retained in the magnetic film to record data. Then by illuminating a laser beam, the magnetism polarizes the reflected light, from which the data can be read.

The hybrid disc comprises a lead-in area 151, not-rewritable data area 152, a user TOC area 154, and a writable and rewritable data area 153 as shown in FIG. 16(c). In the lead-in area 151, data, such as the TOC data, which is data specific to the disc (number of music programs, positions of music programs, playing times, etc. recorded in the not-rewritable data area 152), data indicating the positions of the not-rewritable data area 152, user TOC area 154, writable and rewritable data area 153, and data indicating that the disc is a hybrid disc are recorded using a manufacturing process similar to that for the premastered disc. Further, data such as music is recorded in the not-rewritable data area 152 using a manufacturing process similar to that of the premastered disc.

Like the recordable disc, data (such as music) recorded by a user is recorded in the data area 153, while the user TOC data for the data recorded in the data area 153 is recorded in the user TOC area 152. The hybrid disc is manufactured using the manufacturing processes of both the premastered disc and the hybrid disc.

Accordingly, discrimination among these discs can be accomplished by referencing the data recorded in the lead-in area 151. The premastered disc and the hybrid disc are suitable for identification data setting since the data for identifying the recording medium is unalterable, while the recordable disc is unsuitable for identification data setting since the data for identifying the recording medium is alterable.

Next, a security system according to the present invention will be described below. According to the security system of the present embodiment, the user selects a particular mini disc and the contents (TOC data) recorded in the lead-in area 131, 151 are written into a memory, for example, a rewritable ROM (EEPROM) or the like, contained in the audio equipment. Then, the TOC data of the inserted mini disc is compared with the contents of the memory, and when they match, the audio equipment is made operable. Writing into the ROM is performed by using a ROM writer previously built in the audio equipment. Thus, by performing a prescribed operation, the contents recorded in the lead-in area 131, 151 of the inserted mini disc are written into the ROM contained in the audio equipment.

Figure 9:
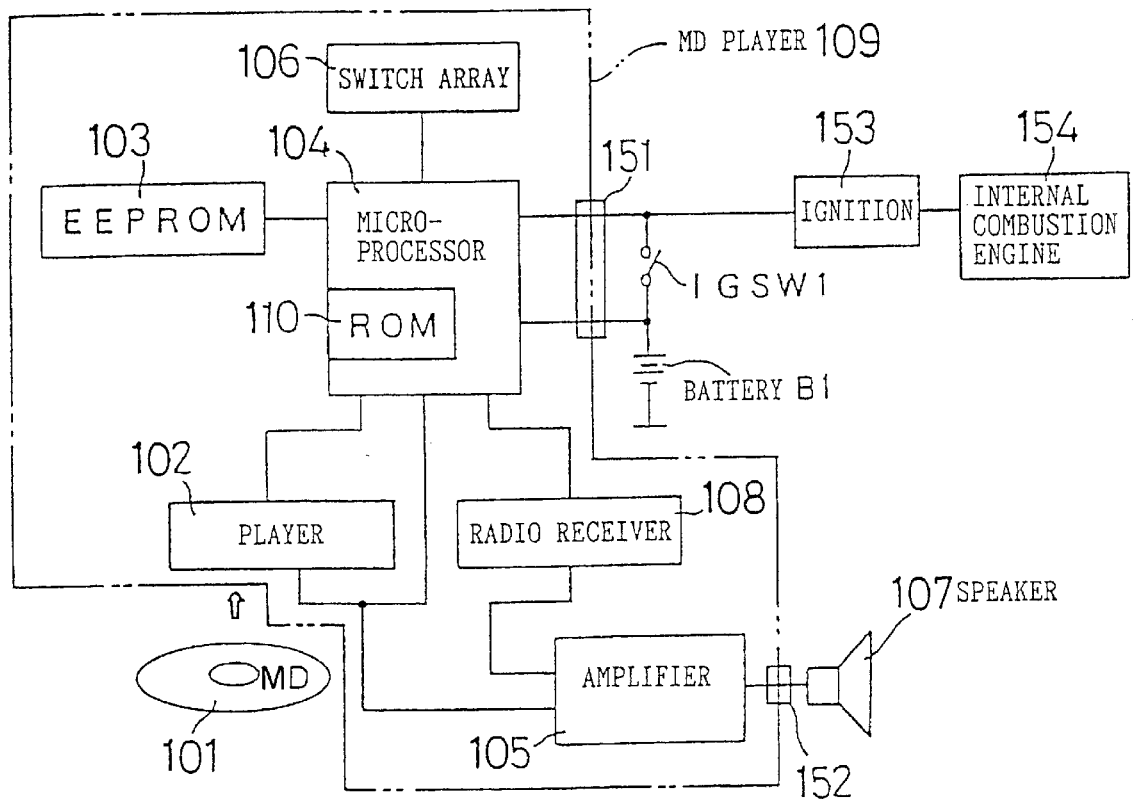
FIG. 9 is a diagram showing the configuration of audio equipment according to another embodiment of the present invention.

FIG. 9 shows a block diagram of audio equipment (a mini-disc player with a built-in radio receiver) according to another embodiment of the present invention. The mini-disc player 109 with a built-in radio receiver comprises: a player 102 which is used to read information from a mini disc 101, to play back audio signals, and to read lead-in information from the MD (mini disc); a radio receiver 108 for receiving radio broadcasts; an amplifier 105 for amplifying audio signals from the player 102 and from the radio receiver 108 for outputting the amplified signals to a speaker 107; a microprocessor 104 for controlling the player 102, the radio receiver 108, and the amplifier 105, and for controlling security-related operations; and an electrically erasable programmable read-only memory (EEPROM) 103 for storing information that is used to release the security operation. The microprocessor 104 is directly connected to a battery on one end and via an ignition switch IGSW1 on another end. The microprocessor 4 monitors the condition of connection to the battery. The microprocessor 104 also contains a ROM (read-only memory) in which programs and the TOC contents of the master disc are stored.

The MD player 109 is mounted detachably, for example, in a console panel of a motor vehicle. Connectors 151 and 152 are respectively provided on a power line between the MD player 109 and the battery B1 and on a signal line between the MD player 109 and the speaker 107. When the MD player 109 is mounted in the console panel, the power line and the signal line are electrically connected by the connectors 151 and 152, respectively. When it is removed from the console panel, the power line and the signal line are disconnected at the connectors 151 and 152, respectively.

The EEPROM 103 is a memory that can electrically retain its stored contents without requiring power supply.

When the driver of the vehicle turns on the ignition switch IGSW1, power from the battery B1 is supplied to an ignition circuit 153 which then impresses a pulse voltage to a spark ignition internal-combustion engine 154 to generate the spark for ignition.

Figure 10:
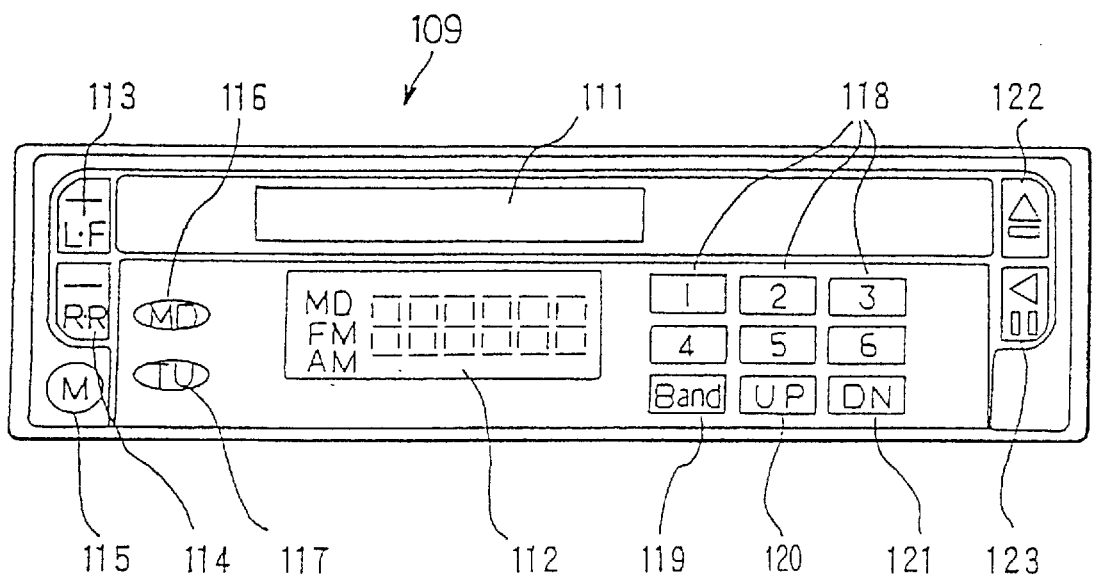
FIG. 10 is a diagram showing the arrangement of the front of automotive audio equipment according to another embodiment of the present invention.

Next, the operation of the audio equipment in one embodiment of the present invention will be described below. FIG. 10 is a schematic diagram showing the arrangement on the front of the automotive audio equipment (the MD player with a built-in radio receiver).

A disc insertion slot 111 for insertion of a mini disc, a display section 112 for presenting various displays, and a plurality of switches for various operations are arranged on the front panel of the MD player 109 which has a built-in radio receiver.

The display section 112 displays information, in accordance with the operation of the player 102 and the radio receiver 108 such as number of music to play on the mini disc, playing time, volume, reception frequency, reception band (AM, FM), etc.

Reference numerals 113 and 114 denote adjusting switches for adjusting the volume, tone, balance, and fader (front/rear balance). The desired item of adjustment (volume, tone, balance, or fader) is selected with a mode switch 15 and is increased or decreased by the adjusting switches 113 and 114. The desired item of adjustment changes in order each time the mode switch 115 is operated, and when the mode switch 115 is left unoperated for more than a predetermined time, the mode automatically returns to the volume adjustment mode.

Reference numerals 116 and 117 denote source selection switches in which the player 102 is selected as the source of sound when the switch 116 is operated and the radio receiver 108 is selected when the switch 117 is operated.

Reference numeral 118 indicates an array of numeric switches which are used to select music programs during the operation of the player 102, and the numeric switches are also used to select preset radio stations during the operation of the radio receiver 108. For example, during the operation of the player 102, when the "3" numeric switch is operated, followed by a playback switch 123 described hereinafter, program No. 3 on the MD is played back. Likewise, during the operation of the radio receiver 108, when the "2" numeric switch is operated momentarily (for example, for less than 2 seconds), the reception frequency stored in the memory corresponding to the No. 2 numeric switch is read out of that memory and the radio receiver 108 is automatically tuned in to the designated frequency. On the other hand, when the "2" numeric switch is pressed and held down for a while (for example, for more than two seconds), the frequency currently being received is written into the memory corresponding to the "2" numeric switch.

Reference numeral 119 denotes a band selection switch which is used to switch between reception bands (AM and FM) of the radio receiver 108. Reference numerals 120 and 121 are UP and DOWN switches used to change the reception frequency. When the DOWN switch 120 is operated, the reception frequency decreases, and when the UP switch 121 is operated, the reception frequency increases.

Reference numeral 122 denotes an eject switch which, when operated, the mini disc loaded in the player 102 is ejected through the disc insertion slot 111. Reference numeral 123 denotes a play switch for the MD player 102, and when this switch is operated during the playback of a mini disc, the playback stops, and when it is operated while the playback is being stopped, the playback of the mini disc starts again.

Next, description is made of the security-related operations for the audio equipment according to the above embodiment of the present invention.

SECURITY OPERATION

When the MD player 109 with a built-in radio receiver, while being set in a security mode, is removed from the vehicle and installed in another vehicle, the security function is activated. In other words, when the MD player 109, with a built-in radio receiver, is set in the security mode, is once removed from the battery and then connected again to the battery, security function is activated. More specifically, when the microprocessor 104 has detected the battery connection condition, that is the change of battery connection condition from a variation in power supply thereby detecting removed condition of the MD player 109, the security system is activated. Once the security system is activated, the MD player 109 with a built-in radio receiver is inoperable. That is, the microprocessor 104 does not accept any switch operation except a prescribed designated operation.

To release this inoperable condition, a designated disc set by the user must be inserted or the MD player 109 with a built-in radio receiver must be taken to the manufacturer or dealer where a master disc is maintained and is inserted, so as to release the inoperable condition and make the MD player 109 with a built-in radio receiver operable.

More specifically, when the MD player 109 with a built-in radio receiver is once removed from the battery while it is set in the security mode (the TOC data of the identification (ID) disc is stored in the EEPROM 103 in the MD player 109 with a built-in radio receiver), and if power is turned on again, the MD player 109 with a built-in radio receiver cannot be operated and the display section 112 presents an indication that the equipment is inoperable due to the activation of the security system ("SEC" illuminates for two seconds). Then, an indication requesting disc insertion appears ("DISC" stays lit until a disc is inserted). When the ID disc is inserted through the disc insertion slot 111, the security condition is released, and an indication indicating that the MD player 109 with a built-in radio receiver is now capable of operation appears ("OK" illuminates for two seconds), after which the disc is ejected and the equipment enters a normal operation mode (for operation of the player 102 or the radio receiver 108).

On the other hand, when a mini disc other than the ID disc (or a disc whose TOC data cannot be read correctly) is inserted through the disc insertion slot 111, the display section 112 displays the unreadable condition along with the number of times that the disc has been inserted ("ERR n" illuminates for two seconds), after which the disc is ejected and the indication requesting disc insertion appears once again ("DISC" stays lit until a disc is inserted).

When mini discs other than the ID disc have been inserted through the disc insertion slot 111 five times in succession, the display section 112 then presents an indication requesting the user to recheck whether the mini discs inserted are the ID disc ("COOL" stays lit for one hour after the equipment was reconnected to the battery), after which the disc is ejected once and (when one hour has elapsed after reconnection to the battery) the indication requesting disc insertion appears once again ("DISC" stays lit until a disc is inserted). In this case, if designated switches are operated in a specified manner (the source selection switch 116 and the "1" and the "2" numeric switches 118 are depressed simultaneously), an indication indicating the faulty condition and suggesting that the equipment be taken to the dealer is displayed ("HELP" stays lit until power is turned off), and the ID disc cancel mode is terminated. Since the waiting time before the ID disc can be inserted for the sixth time is long, the user may decide that he cannot wait that long time and may give up trying to release the inoperable condition by himself after attempting five times. The above arrangement is made so as to encourage the user to let the dealer immediately release the inoperable condition.

Further, when mini discs other than the ID disc have been inserted through the disc insertion slot 111 ten times in succession, again the indication indicating the faulty condition and suggesting that the equipment be taken to the dealer is displayed ("HELP" stays lit until power is turned off), and the ID disc cancel mode is terminated.

Once the indication of the faulty condition and suggestion that the equipment be taken to the dealer is presented, the MD player 109 with a built-in radio receiver remains inoperable even if the power is turned off, and the inoperable condition cannot be released unless a releasing operation is performed using the master disc at the dealer. That is, the insertion of discs other than the ID disk is treated as a simple mistake on the user's side up to nine times, but when the attempt has failed for the tenth time (in succession), the attempt is judged as being an act by a burglar. This arrangement enhances theft prevention performance.

SETTING OF SECURITY MODE AND SETTING OF ID DISC

The security mode is set by the user for writing the TOC data of the identification (ID) disc into the EEPROM 103 contained in the MD player 109 with a built-in radio receiver (ID disc setting operation). That is, the microprocessor 104 determines whether or not the equipment is set in the security mode, by checking whether or not data is stored in the EEPROM 103 (i.e., whether or not it is in the initial condition (usually, "0" is stored)). The ID disc setting operation is performed by first setting the mode to the ID disc setting mode by performing a prescribed operation when power is turned on to the MD player 109 with a built-in radio receiver, and then inserting a mini disc to be used as the ID disc through the disc insertion slot 111 in accordance with the indication displayed on the display section 112 of the radio receiver and MD player 109.

More specifically, at power on, first the source selection switch 116 and the "1" numeric switch 118 are depressed simultaneously to enter the security setting mode, upon which the display section 112 presents an indication indicating that the security setting mode has been entered ("SEC" illuminates for two seconds), and if any mini disc is already loaded, that mini disc is ejected. Next, an indication which requests disc insertion is displayed ("DISC" stays lit until a disc is inserted). When the mini disc to be set as the ID disc is inserted through the disc insertion slot 111, the TOC data of the mini disc is read and written into the EEPROM 103 as identification data. After an indication that the completion of the ID disc setting operation is displayed ("SEC" illuminates for two seconds), the disc is ejected once and the ID disc setting mode is terminated. The equipment then enters a normal operation mode (for operation of the player 102 or the radio receiver 108).

When a mini disc not suitable for the ID disc, for example a mini disc whose TOC data cannot be read due to scratches, has been inserted as an attempt to set itself as the ID disc, that is, when TOC data has not been able to be read from the mini disc inserted in the disc insertion slot 111, an indication of the unreadable condition is displayed on the display section 112 ("ERR" illuminates for two seconds) at the first attempt, after which the disc is ejected and the indication requesting disc insertion appears once again ("DISC" stays lit until a disc is inserted).

If the TOC data read failure has occurred twice in succession, an indication requesting a disc change is displayed on the display section 112 ("CHANGE" illuminates for two seconds), after which the disc is ejected and the indication requesting disc insertion appears once again ("DISC" stays lit until a disc is inserted).

On the other hand, in cases where there is no problem with the disc condition itself and the TOC data can be read successfully but the inserted disc is a recordable disc in which the data for identifying the mini disc is rewritable, the display section 112 presents an indication indicating that the disc is unsuitable ("UNSUIT" illuminates for two seconds), after which the disc is ejected once and the indication requesting disc insertion appears once again ("DISC" stays lit until a disc is inserted).

CLEARING THE SECURITY MODE

The security mode is cleared by erasing (initializing) the identification data stored in the EEPROM 103. That is, the microprocessor 104 erases the identification data stored in the EEPROM 103 when a prescribed operation is performed. The prescribed operation is accomplished by first setting the mode to an ID disc cancel mode by performing a designated operation when power is turned on to the MD player 109 with a built-in radio receiver, and then inserting the previously set ID disc or the master disc maintained at the dealer through the disc insertion slot 111 in accordance with the indication displayed on the display section 112 of the MD player 109 with a built-in radio receiver.

More specifically, at power on, first the source selection switch 116 and the "2" numeric switch 118 are depressed simultaneously to enter the security cancel mode, upon which the display section 112 presents an indication that the security cancel mode has been entered ("SEC" illuminates for two seconds), and if any mini disc is already loaded, that mini disc is ejected. Next, an indication requesting disc insertion is displayed ("DISC" stays lit until a disc is inserted). When the ID disc (or the master disc) is inserted through the disc insertion slot 111, the TOC data written in the EEPROM 103 is erased. After an indication indicating the completion of the ID disc cancel operation is displayed ("CANCEL" illuminates for two seconds), the disc is ejected once and the ID disc cancel mode is terminated. The equipment then enters a normal operation mode (for operation of the player 102 or the radio receiver 108).

On the other hand, when a mini disc other than the ID disc (or a disc whose TOC data cannot be read correctly) is inserted through the disc insertion slot 111, the display section 112 displays the unreadable condition along with the number of times that the disc has been inserted ("ERR n" illuminates for two seconds), after which the disc is ejected once and an indication requesting disc insertion appears once again ("DISC" stays lit until a disc is inserted).

When mini discs other than the ID disc have been inserted through the disc insertion slot 111 five times in succession, the display section 112 then presents an indication requesting the user to recheck whether any of the mini discs inserted are the ID disc ("COOL" flashes five times), after which the disc is ejected once and the indication requesting disc insertion appears once again ("DISC" stays lit until a disc is inserted).

Further, when mini discs other than the ID disc have been inserted through the disc insertion slot 111 ten times in succession, an indication indicating the faulty condition and a suggestion that the equipment be taken to the dealer is displayed ("HELP" stays lit until power is turned off), and the ID disc cancel mode is terminated.

Also, the MD player 109 with a built-in radio receiver remains inoperable even if the power is turned off once, and the inoperable condition cannot be released unless a releasing operation is performed using the master discs maintained at the dealer. That is, the insertion of a disc other than the ID disk is treated as a simple mistake on the user's side up to nine times, but when the attempt has failed for the tenth time (in succession), the attempt is judged as being an act by a burglar. This arrangement enhances theft prevention performance.

MASTER INPUT MODE (RELEASE OF INOPERABLE CONDITION AT DEALER, ETC.)

Once the indication of the faulty condition and suggestion that the equipment be taken to the dealer ("HELP" stays lit until power is turned off) has been presented on the display section 112 after failing to clear the security mode or after failing to release the inoperable condition, the inoperable condition can be released only by inserting the master disc maintained at the dealer through the disc insertion slot. In this case, the security mode is also cleared. That is, the data stored in the EEPROM 103 is erased.

Specifically, at power on, an indication indicating that the master input mode has been entered is displayed on the display section 112 ("HELP" illuminates). By performing a prescribed operation (simultaneous depression of the source selection switch 116 and the "3" and the "4" numeric switches 118), the inoperable condition can be released by using the master disc, and an indication requesting insertion of the master disc appears ("DISC" keeps flashing until the disc is inserted). When the master disc is inserted through the disc insertion slot 111, the inoperable condition of the MD player 109 with a built-in radio receiver is released, and at the same time, the TOC data written in the EEPROM 103 is erased. After an indication of the completion of the inoperable condition releasing operation is displayed ("OK" illuminates for two seconds), the disc is ejected once and the master disc input mode is terminated. The equipment then enters a normal operation mode (for operation of the player 102 or the radio receiver 108).

On the other hand, when a disc other than the master disc is inserted through the disc insertion slot 111, the display section 112 displays the unreadable condition along with the number of times that the disc has been inserted ("ERR n" illuminates for two seconds), after which the disc is ejected once and the indication requesting disc insertion appears once again ("DISC" keeps flashing until a disc is inserted).

Further, when mini discs other than the master disc have been inserted through the disc insertion slot 111 for an integral multiple of 5 times (5 times, 10 times, . . . ) in succession, the condition returns to the same condition as at power on, and the display section 112 once again presents the indication that the master input mode has been entered ("HELP" illuminates), requiring that the prescribed operation be performed once again if the inoperable condition is to be released.

Next, description is made of the processing that the microprocessor 104 carries out to accomplish the above-described operations.

Figure 11:
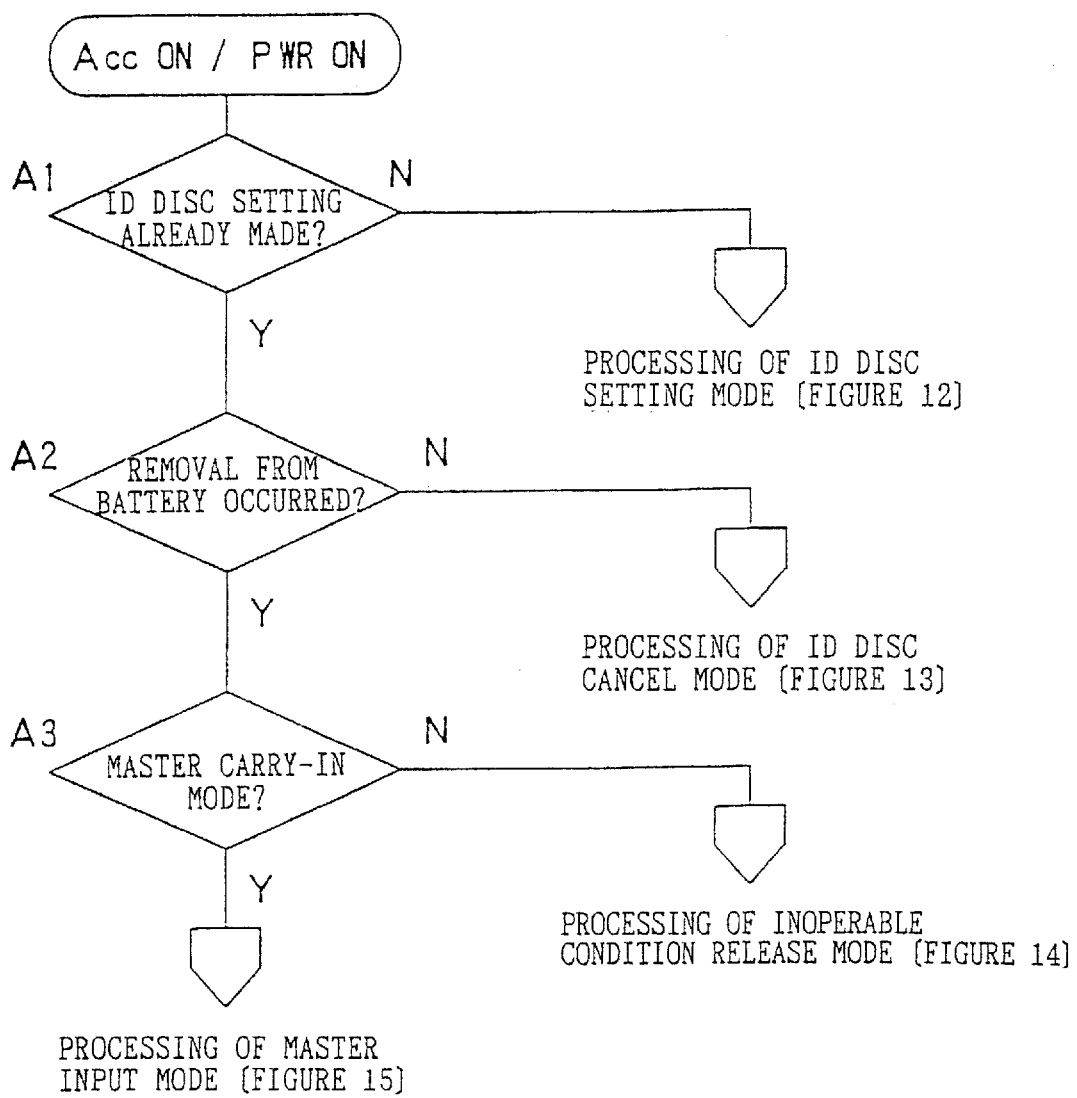
FIG. 11 is a flowchart illustrating a main routine of different modes of operation.

FIG. 11 is a flowchart illustrating the main routine of the processing that the microprocessor 104 performs. When the MD player 109 with a built-in radio receiver is put into operation by turning on the accessory switch of a vehicle (by operating the ignition switch), or by turning on the power switch on the MD player 109 with a built-in radio receiver, the process is started and the operation first proceeds to step A1.

In step A1, a decision is made as to whether or not an ID disc setting has already been performed. If no ID disc setting has yet been performed, a branch is made to the processing of the ID disc setting mode. If there already exists a valid ID disc setting, the process moves to step A2. This aforementioned decision is made based on whether the TOC data of the ID disc is stored in the EEPROM 103.

In step A2, a decision is made as to whether the connection between the MD player 109 with a built-in radio receiver and the battery B1 has ever been cut off. If the answer to the decision is NO, a branch is made to the processing of the ID disc cancel mode. If the answer is YES, the process proceeds to step A3. This decision is made by the microprocessor 104 which monitors the voltage across the connection terminals with the battery B1 and acknowledges a voltage drop condition if any voltage drop is detected.

In step A3, a decision is made as to whether the mode is the master carry-in mode. If it is not the master carry-in mode, a branch is made to the processing of the inoperable condition release mode. If it is the master carry-in mode, a branch is made to the processing of the master input processing mode. This decision is made by the microprocessor 104 which acknowledges a failure of inoperable condition release operation, a failure of ID disc cancel operation, etc.

When the MD player 109 with a built-in radio receiver has been placed in operation with the above processing, (a) If the ID disc is not set, a branch is made to the processing of the ID setting mode, (b) If the ID disc is set and if no disconnection of the radio MD player 109 with a built-in radio receiver from the battery B1 has been detected, a branch is made to the processing of the ID disc cancel mode, (c) If the ID disc is set, if a disconnection of the radio MD player 109 with a built-in radio receiver from the battery B1 has ever been detected, and if the mode is not the master carry-in mode, a branch is made to the processing of the inoperable condition release mode, (d) If the mode is the master carry-in mode, a branch is made to the processing of the master input processing mode.

Figure 12:
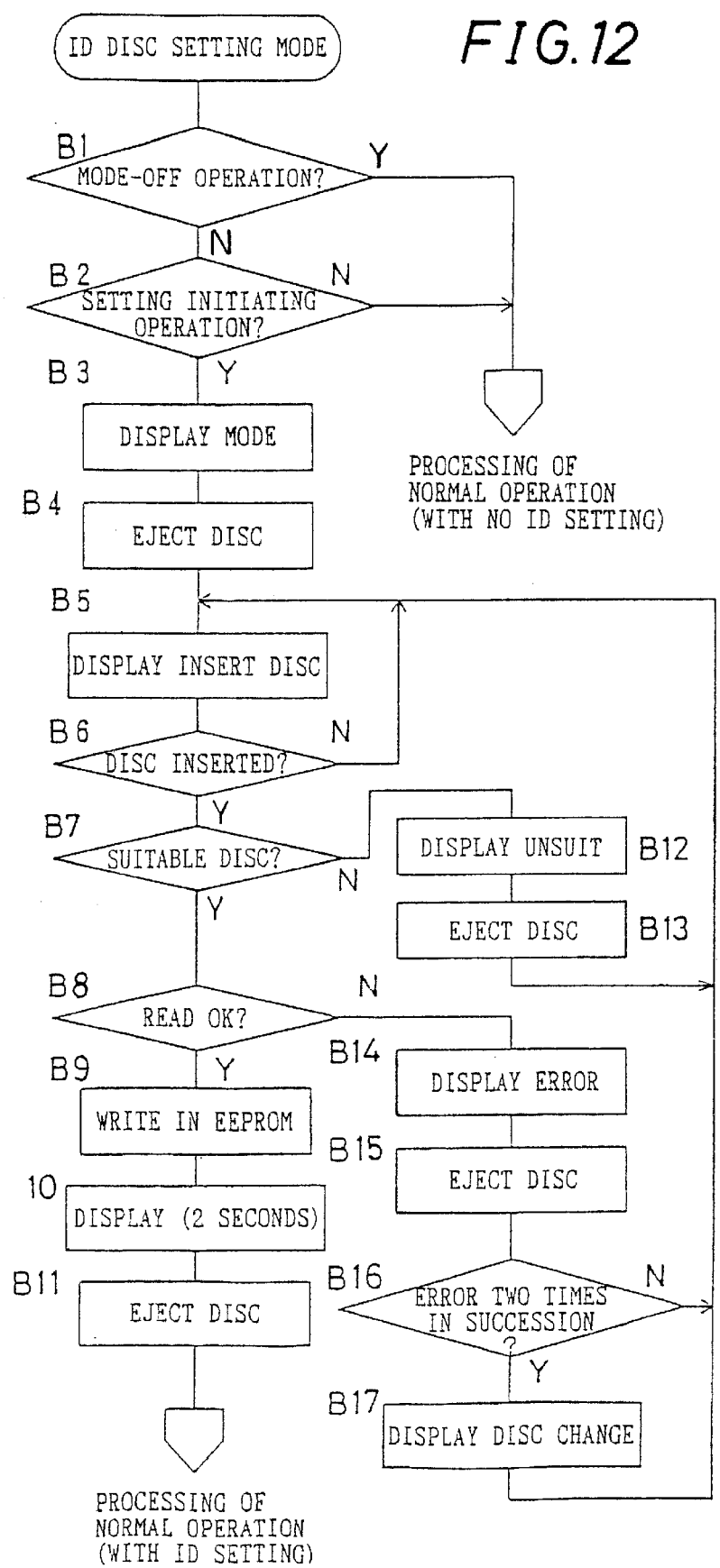
FIG. 12 is a flowchart illustrating the processing of an ID disc setting mode.

Next, the processing of the ID disc setting mode (which also includes the security mode setting processing) will be described. FIG. 12 is a flowchart illustrating the processing of the ID disc setting mode that the microprocessor 104 performs.

When a branch is made from the main routine to the processing of the ID disc setting mode, the processing starts and proceeds to step B1 where a decision is made as to whether a mode-off operation has been performed. A mode-off operation is an operation other than setting initiating operations, and refers to any normal operation of the MD player 109 with a built-in radio receiver, such as the operation of the source selection switches 116, 117, play switch 123, or the inserting operation of a mini disc into the disc insertion slot 111 etc. If it is decided that a mode-off operation has been performed, the ID disc setting operation (data writing to the EEPROM 103) is skipped, and the process moves to the processing of the normal operation to control the operation of the player 102 and the radio receiver 108. Otherwise, the process moves to step B2.

In step B2, a decision is made as to whether an ID disc setting initiating operation has been performed. If the answer to the decision is YES, the process proceeds to step B3. If the answer is NO, the operation proceeds to the processing of the normal operation. The ID disc setting initiating operation is performed by operating designated switches in a prescribed manner. In this embodiment, as previously described, simultaneous depression of the source selection switch 116 and the "1" numeric switch 118 constitutes the ID disc setting initiating operation. Decisions in steps B1 and B2 are made by performing interrupt processing to detect the operation of the various switches or the inserting operation of a mini disc into the disc insertion slot 111. With these interrupts, the process moves to the next step.

In step B3, an indication indicating that the ID disc setting mode has been entered is displayed ("SEC" illuminates for two seconds), after which the process proceeds to step B4. In step B4, if any disc is already loaded in the player 102, the disc is ejected. In step B5, an indication ("DISC") directing the insertion of a mini disc is displayed, and the processing in step B5 and B6 is repeated until it is judged in step B6 that a mini disc has been inserted. When a mini disc has been inserted, the process moves to step B7, where a decision is made as to whether the inserted mini disc is a suitable disc, that is, whether the inserted disc is not a recordable disc (or whether or not the inserted disc is either a premastered disc or a hybrid disc). If it is a premastered disc or a hybrid disc (either is a suitable disc), the process proceeds to step B8. On the other hand, if it is a recordable disc (not a suitable disc), the process moves to step B12.

In step B8, a decision is made as to whether the TOC data of the inserted mini disc can be read correctly. That is, whether the mini disc is suitable for the ID disc. If the data can be read correctly, the process proceeds to step B9. Otherwise, the process proceeds to step B14. In step B9, the TOC data of the mini disc is written into the EEPROM 103 as the identification data. Then, in step B10, an indication of the completion of the ID disc setting operation is displayed ("SEC" illuminates for two seconds), and in step B11, the mini disc is ejected, after which the process moves to the processing of the normal operation.

On the other hand, in step B12, an indication that the mini disc is not a suitable disc is displayed ("UNSUIT" illuminates for two seconds), and in step B13, the mini disc is ejected, after which the process moves to step B16.

In step B14, an indication indicating that the TOC data of the mini disc cannot be read correctly is displayed ("ERR" illuminates for two seconds), after which the mini disc is ejected in step B15, and the process moves to step B16. In step B16, it is determined whether the TOC data reading has failed twice in succession. If it has failed twice in succession, then the disc is determined as being unsuitable for the ID disc because of scratches etc., and the process proceeds to step B17 where an indication requesting disc change is displayed ("CHANGE" illuminates for two seconds). If the reading failure is not the second time in succession, the process returns to step B5 to repeat the processing.

Figure 13:
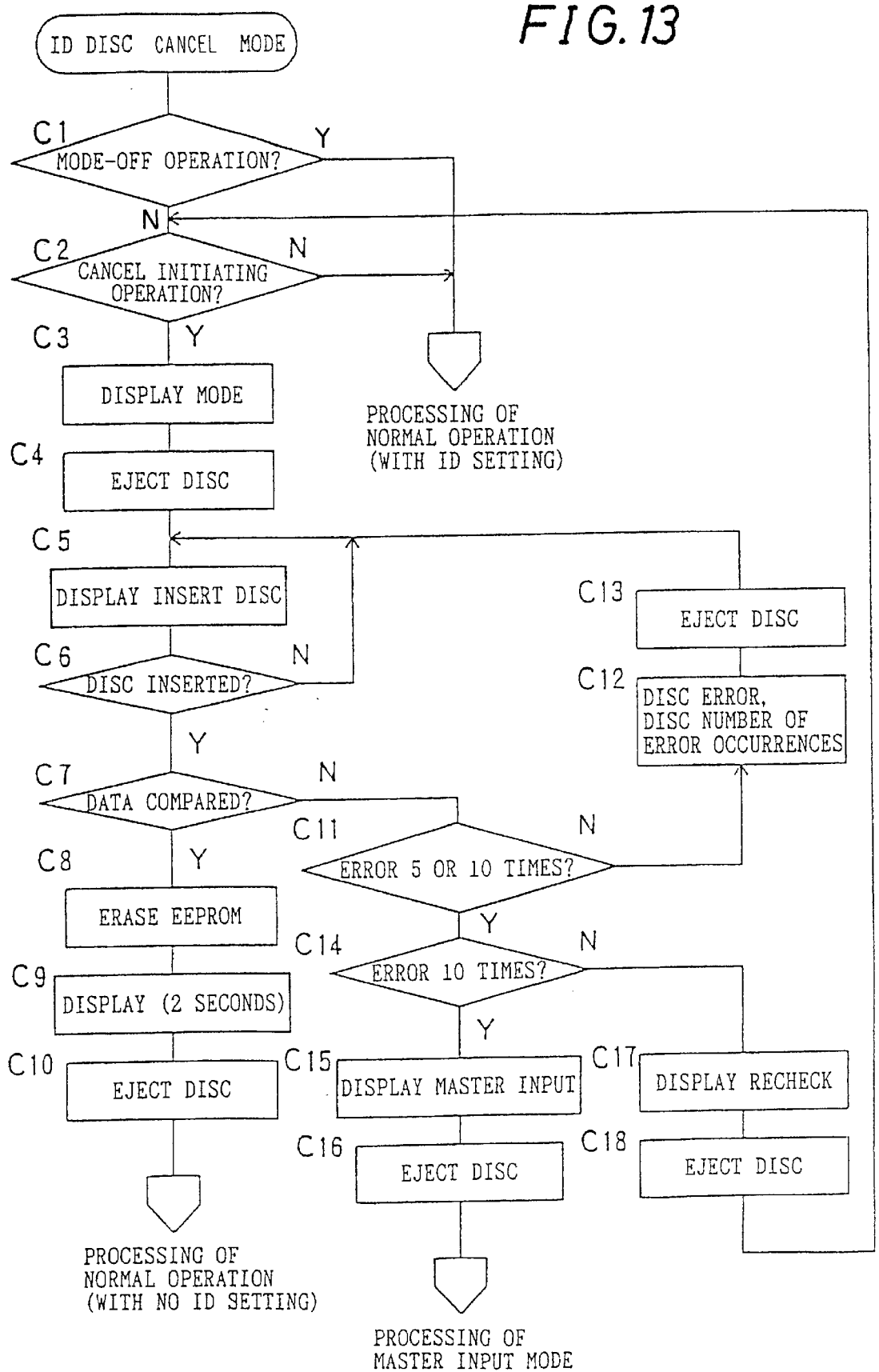
FIG. 13 is a flowchart illustrating the processing of an ID disc cancel mode.

Next, the processing of the ID disc cancel mode (which also includes the security mode release operation) will be described. FIG. 13 is a flowchart illustrating the processing of the ID disc cancel mode that is performed by the microprocessor 104.

When a branch is made from the main routine to the processing of the ID disc cancel mode, the processing starts with step C1 where a decision is made as to whether a mode-off operation has been performed. A mode-off operation, as described in the processing of the ID disc setting mode, is an operation other than setting initiating operations, and refers to any normal operation of the MD player 109 with a built-in radio receiver, such as the operation of the source selection switches 116, 117, play switch 123, or the inserting operation of a mini disc into the disc insertion slot 111. If it is decided that a mode-off operation has been performed, the ID disc cancel operation (erasure of data in the EEPROM 103) is skipped, and the process proceeds to the processing of normal operation to control the operation of the player 102 and the radio receiver 108. Otherwise, the process proceeds to step C2.

In step C2, a decision is made as to whether an ID disc cancel initiating operation has been performed. If the answer to the decision is YES, the process moves to step C3. If the answer is NO, the operation proceeds to the processing of the normal operation. The ID disc cancel initiating operation is performed by operating designated switches in a prescribed manner. In this embodiment, as previously described, simultaneous depression of the source selection switch 116 and the "2" numeric switch 118 constitutes the ID disc cancel initiating operation. Decisions in steps C1 and C2 are made by servicing interrupts to detect the operation of the various switches or the inserting operation of a mini disc into the disc insertion slot 111. With these interrupts, the process moves to the next processing.

In step C3, an indication that the ID disc cancel mode has been entered is displayed ("SEC" illuminates for two seconds), after which the process moves to step C4. In step C4, any disc that is already loaded in the player 102 is ejected. In step C5, an indication ("DISC") directing a user to insert a mini disc is displayed, and the processing in step C5 and C6 is repeated until a determination is made in step C6 that a mini disc has been inserted. When a mini disc has been inserted, the process moves to step C7, where a decision is made as to whether or not the TOC data of the inserted mini disc matches the TOC data (the TOC data of the ID disc) stored in the EEPROM 103 or the master disc TOC data non-erasably stored in the ROM of the microprocessor 104. If the TOC data matches, the process moves to step C8 to erase the data stored in the EEPROM 103. Then, in step C9, an indication that the completion of the ID disc cancel operation is displayed ("CANCEL" illuminates for two seconds), and in step C10, the mini disc is ejected. Then, the process moves to the processing of the normal operation.

In step C11, a determination is made as to whether a TOC data mismatch has occurred five times or ten times in succession, and in step C14, it is determined whether a TOC data mismatch has occurred ten times in succession. If the occurrence of TOC data mismatch is the tenth time in succession, the process moves to step C15, where an indication of the faulty condition and suggestion that the apparatus be taken to the dealer is displayed ("HELP" stays lit until power is turned off). Then, in step C16, the mini disc is ejected, and the process moves to the processing of the master input mode.

On the other hand, if the occurrence of TOC data mismatch is the fifth time in succession, the process moves to step C17, where an indication requesting the user to recheck whether the mini disc inserted is the ID disc is displayed ("COOL" flashes five times). Then, in step C18, the mini disc is ejected and the process returns to step C2 to repeat the processing.

If the number of occurrences of the TOC data mismatch is neither 5 nor 10 times in succession, the process moves to step C12, where an indication of the unreadable condition or indication that the inserted disc is not the ID disc and also indication of the number of occurrences, is displayed ("ERR n" illuminates for two seconds). Then, in step C13, the mini disc is ejected and the process returns to step C5 to repeat the processing.

Figure 14:
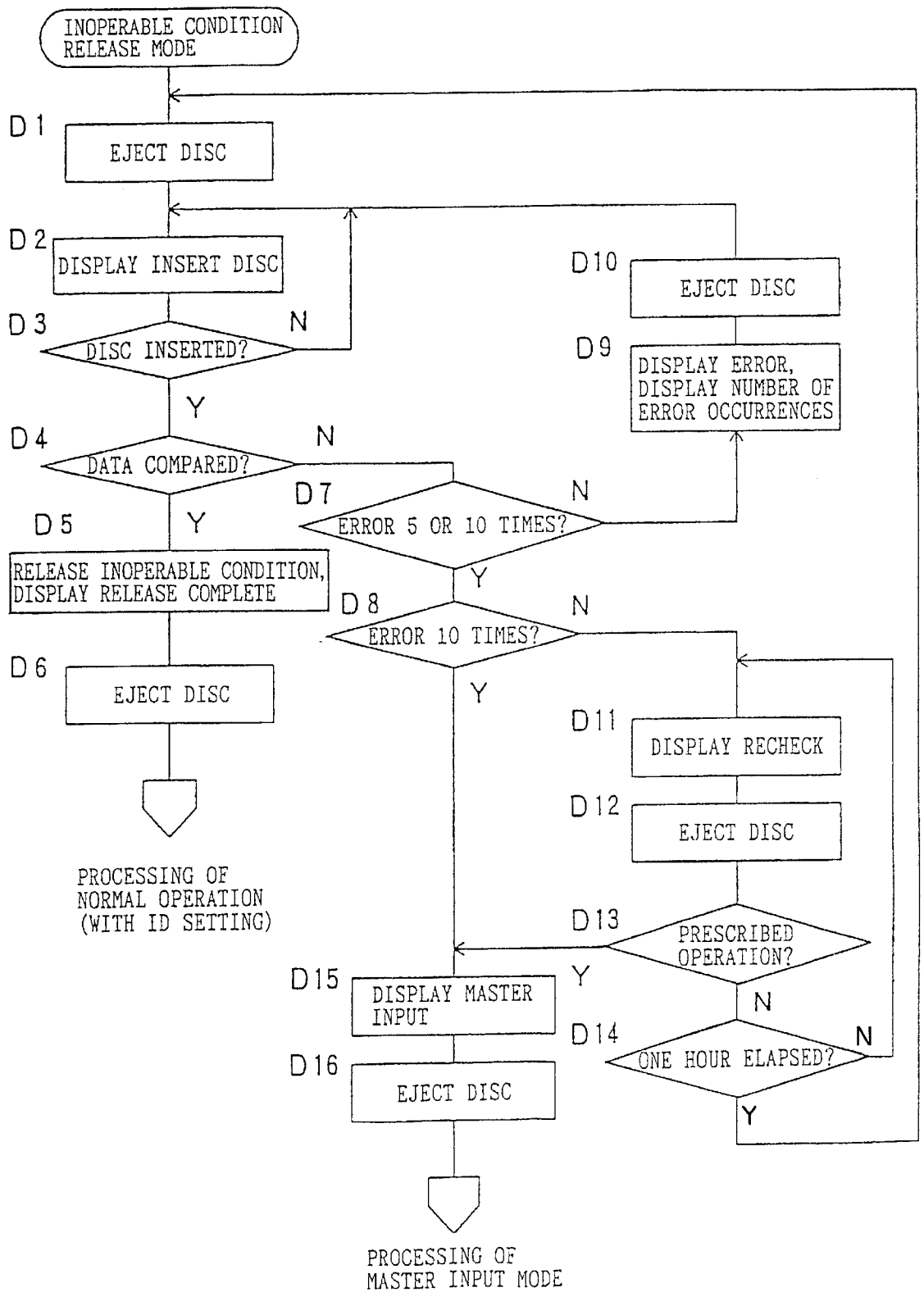
FIG. 14 is a flowchart illustrating the processing of an inoperable condition release mode.

Next, the processing of the inoperable condition release mode will be described. FIG. 14 is a flowchart illustrating the processing of the inoperable condition release mode that is performed by the microprocessor 104.

When a branch is made from the main routine to the processing of the inoperable condition release mode, the processing starts with step D1 where any disc which is already loaded in the player 102 is ejected. In step D2, an indication directing the insertion of a mini disc is displayed ("DISC" illuminates), and the processing in step D2 and D3 is repeated until it is determined in step D3 that a mini disc has been inserted. When a mini disc has been inserted, the process moves to step D4, where a decision is made as to whether or not the TOC data of the inserted mini disc matches the TOC data (the TOC data of the ID disc) stored in the EEPROM 103 or the master disc TOC data permanently stored in the ROM of the microprocessor 104. If the TOC data matches, the process moves to step D5 to release the inoperable condition (by erasing the memory that retains the removal from the battery B1), and an indication that the completion of the inoperable condition release operation has been reached is displayed ("OK" illuminates for two seconds). Then, the mini disc is ejected in step D6, after which the process moves to the processing of the normal operation.

In step D7, determination is made as to whether the TOC data mismatch has occurred five times or ten times in succession, and in step D8, it is determined whether the TOC data mismatch has occurred ten times in succession. If the occurrence of the TOC data mismatch is the tenth time in succession, the process moves to step D15, where an indication of the faulty condition and suggestion that the apparatus be taken to the dealer is displayed ("HELP" stays lit until power is turned off). Then, the mini disc is ejected in step D16, after which the process moves to the processing of the master input mode.

On the other hand, if the occurrence of the TOC data mismatch is the fifth time in succession, the process moves to step D11, where an indication requesting the user to recheck whether the mini disc inserted is the ID disc is displayed ("COOL" flashes five times). Then, the mini disc is ejected in step D12. In step D13, a decision is made as to whether an operation for forced transfer to the master input mode has been performed. If the answer to the decision is YES, the process moves to step D15. Otherwise, the process moves to step D14, where it is determined whether one hour has elapsed since the MD player 109 with a built-in radio receiver was reconnected to the battery B1. The processing in steps D11 to D13 is repeated until one hour has elapsed. When one hour has elapsed, the process returns to step D1 to repeat the processing. The operation for forced transfer to the master input mode is performed by operating designated switches in a prescribed manner. In this embodiment, as previously described, simultaneous depression of the source selection switch 116 and the "1" and the "2" numeric switches 118 constitutes the operation for mode forced transfer to the master input mode.

If the number of occurrences of the TOC data mismatch is neither 5 or 10 in succession, the process moves to step D9, where an indication that the unreadable condition or indication that the inserted disc is not the ID disc and also an indication of the number of occurrences is displayed ("ERR n" illuminates for two seconds). Then, the mini disc is ejected in step D10, and the process returns to step D2 to repeat the processing.

Figure 15:
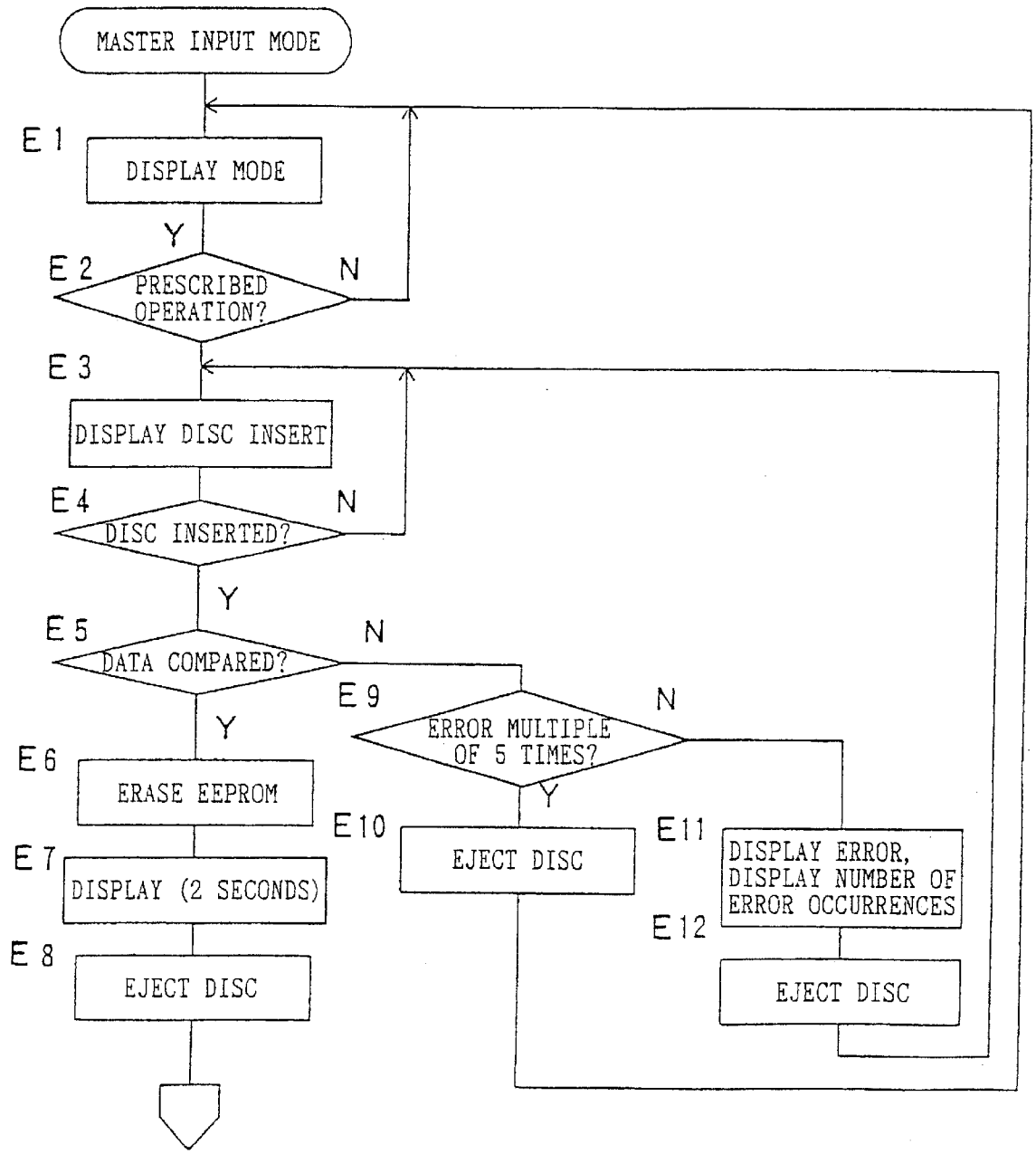
FIG. 15 is a flowchart illustrating the processing of a master input mode.

Next, the processing of the master input mode will be described. FIG. 15 is a flowchart illustrating the processing of the master input mode that is performed by the microprocessor 104.

When a branch is made from the main routine to the processing of the master input mode, the processing starts with step E1 where an indication that the master input mode has been entered is displayed ("HELP" illuminates for two seconds). Then, the process moves to step E2.

In step E2, a decision is made as to whether a master input initiating operation has been performed. If the answer to the decision is YES, the process moves to step E3. Otherwise, the processing in steps E1 and E2 are repeated until the initiating operation has been performed. The master input initiating operation is performed by operating designated switches in a prescribed manner. In this embodiment, as previously described, simultaneous depression of the source selection switch 116 and the "3" and the "4" numeric switches 118 constitutes the master input initiating operation.

In step E3, an indication ("DISC") directing the insertion of a mini disc is displayed, and the processing in step E3 and E4 is repeated until it is determined in step E4 that a mini disc has been inserted. When a mini disc has been inserted, the process proceeds to step E5.

In step E5, a decision is made as to whether or not the TOC data of the inserted mini disc matches the master disc TOC data which is permanently stored in the ROM of the microprocessor 104. If the TOC data matches, the process moves to step E6 to erase the data stored in the EEPROM 103. In step E7, an indication of the completion of the master input processing is displayed ("OK" illuminates for two seconds). Then, the mini disc is ejected in step E8, after which the process moves to the processing of the normal operation.

If the TOC data does not match (in step E5), the process moves to step E9 to determine whether a TOC data mismatch has occurred an integral multiple of 5 times in succession. If the TOC data mismatch has occurred an integral multiple of 5 times in succession, the process moves to step E10, where the mini disc is ejected and, after which, the process returns to step E1 to repeat the processing. On the other hand, if the number of occurrences of TOC data mismatch is not an integral multiple of 5 times in succession, the process proceeds to step E11, where an indication of the unreadable condition or an indication that the inserted disc is not the master disc and also an indication of the number of occurrences is displayed ("ERR n" illuminates for two seconds). Then, the mini disc is ejected in step E12, and the process returns to step E3 to repeat the processing.

With the above processing, the security function activating operation, the security mode setting operation (ID disc setting operation), the security mode release operation (ID disc cancel operation), can be accomplished.

As described in detail above for the present embodiment, an anti-theft system for an automotive MD player with a built-in radio receiver is constructed using a mini disc itself as the key. This construction achieves an easy-to-operate anti-theft system free from the inconvenience associated with the use of a secret identification code.

In the present embodiment, only one ID disc can be set, but it is also possible to increase the anti-theft performance by making provisions so that a plurality of ID discs can be set and so that the inoperable condition, the security mode, cannot be released until all the ID discs have been inserted in the player 102. Alternatively, provisions may be made so that the inoperable condition, the security mode, can be released by inserting any one of the plurality of ID discs. In which case, for example, each authorized user of a vehicle maintains one of the ID discs and, by using the ID disc each user maintains, the user can release the inoperable condition. Such functional modifications can be achieved by making minor modifications to the portion of the processing contents of the microprocessor 104 which is responsible for the ID disc setting and to the portion which is responsible for matching the inserted mini disc against the TOC data stored in the EEPROM 103.

POTENTIAL FOR INDUSTRIAL UTILIZATION

According to the present invention, since the release of security function does not require manual input of a secret identification code, the security function can be released easily, and furthermore, there is no need to remember a secret identification code. This eliminates the possibility of a situation where the user forgets the identification code and cannot release the security function. Moreover, since the security function cannot be released without using a designated recording medium, the level of security is increased.

Furthermore, in the case of a recording medium in which data for identifying the recording medium is alterable, the data for identifying the recording medium is prohibited from being written to memory as identification data. Thus, this allows for the avoiding a situation where a recording medium, unsuitable as an identification recording medium for security, can be set as the identification recording medium for security. This prevents the data on the identification recording medium from being rewritten accidentally, leading to the inability to release the inoperable condition of the audio equipment.

It is also possible to further increase the security capability of the present invention by combining the method of the present invention with a method requiring an input of a secret identification code.

What is claimed is:

1. A security system for audio equipment capable of reproducing signals recorded on a removable recording medium, wherein the audio equipment, while being in an inoperable condition, is changed into an operable condition when the removable recording medium is inserted into the audio equipment and data recorded on the removable recording medium, during a playback condition, matches identification data stored in a memory, said security system comprising:

a read-only memory having stored therein master data from a master recording medium; and inoperativeness releasing means for changing the audio equipment from being in the inoperable condition into the operable condition and for ejecting the removable recording medium from the audio equipment when the removable recording medium is inserted into the audio equipment and data recorded on the removable recording medium, during a playback condition, matches the master data stored in said read-only memory.

2. A security system for audio equipment capable of reproducing signals recorded on a recording medium, wherein the audio equipment, while being in an inoperable condition, is changed into an operable condition when the recording medium is inserted into the audio equipment and data recorded on the recording medium during a playback condition matches identification data stored in a memory, said security system comprising:

a read-only memory having stored therein master data from a master recording medium;

inoperativeness releasing means for changing the audio equipment from being in the inoperable condition into the operable condition when the data recorded on the recording medium, during a playback condition, matches the master data stored in said read-only memory;

mode-change-over means for changing a mode of said security system to an identification medium cancel mode that allows the identification data stored in the memory to be erased; and identification data erasing means for erasing the identification data stored in the memory when the master recording medium, having data recorded thereon which matches the master data stored in the read-only memory, is in the playback condition and the mode of said security system has been changed to the identification medium cancel mode by said mode-change-over means.

3. The security system of claim 2, wherein said security system further comprises identification data erasing control means for controlling said data erasing means when the mode of said security system has been changed to the identification medium cancel mode by said mode-change-over means, wherein said identification data erasing control means disables the erasing of the identification data stored in the memory when a mismatch between the data recorded on the recording medium, during a playback condition, and the identification data stored in the memory has been detected a predetermined number of times in succession, and wherein said identification data erasing control means enables the erasing of the identification data stored in the memory only when the data recorded on the recording medium, during a playback condition, matches the master data stored in said read-only memory.

4. A security system for audio equipment capable of reproducing signals recorded on a recording medium, wherein the audio equipment, while being in an inoperable condition, is changed into an operable condition when the recording medium is inserted into the audio equipment and data recorded on the recording medium, during a playback condition, matches identification data stored in a memory, said security system comprising:

a read-only memory having stored therein master data from a master recording medium;

inoperativeness release control means for disabling the use of the recording medium, having data recorded thereon which matches the identification data, for changing the audio equipment from being in the inoperable condition to the operable condition when a mismatch between the data recorded on the recording medium, during a playback condition, and the identification data stored in the memory occurs more than a predetermined number of times in succession, and for changing the audio equipment from being in the inoperable condition to the operable condition only when the data recorded on the recording medium, during a playback condition, matches the master data stored in said read-only memory.

5. A security system for audio equipment capable of reproducing signals recorded on a recording medium, wherein the audio equipment, while being in an inoperable condition, is changed into an operable condition when the recording medium is inserted into the audio equipment and data recorded on the recording medium, during a playback condition, matches identification data stored in a memory, said security system comprising:

mode-change-over means for changing a mode of said security system to an identification medium cancel mode that allows the identification data stored in the memory to be erased; and identification data erasing means for erasing the identification data stored in the memory when the recording medium, having data recorded thereon that matches the identification data stored in the memory, is placed in the playback condition and the mode of said security system has been changed to the identification medium cancel mode by said mode-change-over means.

* * * * *